US011389764B2

(12) United States Patent
Thierry et al.

(10) Patent No.: US 11,389,764 B2
(45) Date of Patent: Jul. 19, 2022

(54) PROCESS FOR TREATING A NATURAL GAS CONTAINING CARBON DIOXIDE

(71) Applicant: TOTAL SE, Courbevoie (FR)

(72) Inventors: Phuc-Tien Thierry, Courbevoie (FR); Denis Chretien, Paris (FR); Claire Weiss, Vaucresson (FR); Salim Azzi, Montigny le Bretonneux (FR); Aneke Igwume, Amsterdam (NL)

(73) Assignee: TOTAL SE, Courbevoie (FR)

( * ) Notice: Subject to any disclaimer, the term of this patent is extended or adjusted under 35 U.S.C. 154(b) by 6 days.

(21) Appl. No.: 16/963,142

(22) PCT Filed: Jan. 17, 2018

(86) PCT No.: PCT/FR2018/050118
§ 371 (c)(1),
(2) Date: Jul. 17, 2020

(87) PCT Pub. No.: WO2019/141909
PCT Pub. Date: Jul. 25, 2019

(65) Prior Publication Data
US 2021/0236986 A1 Aug. 5, 2021

(51) Int. Cl.
*B01D 53/22* (2006.01)
*C10L 3/10* (2006.01)

(52) U.S. Cl.
CPC ............ *B01D 53/226* (2013.01); *C10L 3/104* (2013.01); *B01D 2256/245* (2013.01);
(Continued)

(58) Field of Classification Search
CPC .................................................. B01D 53/226
See application file for complete search history.

(56) References Cited

U.S. PATENT DOCUMENTS

| 4,152,129 A | 5/1979 | Trentham et al. | |
|---|---|---|---|
| 2003/0111402 A1* | 6/2003 | Baig | B01D 53/22 210/321.75 |

(Continued)

FOREIGN PATENT DOCUMENTS

| JP | 2013-17939 | * 1/2013 | ............. B01D 53/22 |
|---|---|---|---|

OTHER PUBLICATIONS

English language machine translation for JP 2013-17939. Retrieved from translationportal.epo.org on Oct. 20, 2021. (Year: 2021 ).*

(Continued)

*Primary Examiner* — Jason M Greene
(74) *Attorney, Agent, or Firm* — Patterson Thuente Pedersen, P.A.

(57) ABSTRACT

A method for treating a natural gas containing carbon dioxide using membrane modules which are assigned to a first treatment stage or a second treatment stage and are fluidically connected to a retentate mode or a permeate mode. When evolution in the operating conditions results in one of the processing levels requiring less membrane surface for gas processing and the other processing level requiring more membrane surface for gas processing, then the method allows for reassignment of needed membrane modules assigned from one processing level requiring less membrane surface to another processing level requiring more membrane surface.

8 Claims, 11 Drawing Sheets

(52) U.S. Cl.
CPC .. *B01D 2257/504* (2013.01); *B01D 2317/022* (2013.01); *B01D 2317/025* (2013.01); *B01D 2317/06* (2013.01); *C10L 2290/548* (2013.01)

(56) References Cited

U.S. PATENT DOCUMENTS

| | | |
|---|---|---|
| 2007/0125537 A1 | 6/2007 | Lokhandwala et al. |
| 2010/0186586 A1* | 7/2010 | Chinn .................. B01D 53/228 95/45 |
| 2011/0009684 A1 | 1/2011 | Diaz et al. |
| 2012/0000355 A1 | 1/2012 | Sharma et al. |
| 2016/0146764 A1* | 5/2016 | Akmal ................. B01D 53/225 73/23.41 |
| 2017/0327758 A1 | 11/2017 | Tanaka et al. |
| 2019/0143263 A1* | 5/2019 | Reese .................. B01D 53/226 95/45 |

OTHER PUBLICATIONS

International Search Report for PCT/FR2018/050118, dated Oct. 25, 2018, 4 pages.
English translation of International Search Report for PCT/FR2018/050118, dated Oct. 25, 2018, 2 pages.
Written Opinion for PCT/FR2018/050118, dated Oct. 25, 2018, 6 pages.

* cited by examiner

PROCESS FOR TREATING A NATURAL GAS CONTAINING CARBON DIOXIDE

The present application is a National Phase entry of PCT Application No. PCT/FR2018/050118, filed Jan. 17, 2018, which application is hereby incorporated by reference herein in its entirety.

FIELD OF THE INVENTION

The present invention relates to a membrane processing method for processing a natural gas originating from a deposit so as to extract the carbon dioxide fraction contained therein in order to reinject it within the deposit. The present invention also relates to an installation adapted to implement this method.

BACKGROUND OF THE INVENTION

In the context of natural gas production, it is necessary to purify natural gas originating from a deposit of a number of contaminants, including acid gases such as carbon dioxide. Reinjecting the carbon dioxide obtained thereby into a deposit is receiving increasing attention because it allows:
 sequestering carbon dioxide;
 maintaining high pressure in the deposit in order to give support to the oilfield production when production declines; and
 improving oil production by sweeping of a deposit reservoir.

However, in order to reinject carbon dioxide extracted from natural gas into the deposit, the carbon dioxide must be of sufficient quality. In addition, carbon dioxide reinjected into the reservoir will eventually come out of this reservoir, enriching the natural gas from the reservoir. Thus, carbon dioxide can make up a large share of the gas mix from a natural gas deposit, amounting to over 70 mol %.

Natural gas purification processes must therefore be able to produce carbon dioxide of sufficient quality and be able to process a natural gas comprising an increasing carbon dioxide fraction.

In addition, in order to be reinjected into the reservoir, carbon dioxide is compressed using a compressor, thereby increasing the energy bill for this type of process.

Several methods are known in the art, to allow the natural gas to separate from the carbon dioxide and allow subsequent reinjection thereof.

The most common processing is based on the use of amine solvents. This method allows a very selective separation of carbon dioxide from hydrocarbons and allows the concentration of carbon dioxide to be lowered below the 50-ppm threshold. But this method requires significant energy consumption for solvent regeneration. It is therefore unsuitable when the carbon dioxide concentration is high in the original gas. In addition, the regeneration process is performed at a quasi-atmospheric pressure, and requires compression which consumes a lot of energy if the separated carbon dioxide is to be reinjected.

Another type of processing relies on cryogenic processes. The energy interest thereof is all the more important where the carbon dioxide concentration in the original gas is high. An example of a cryogenic process is disclosed in document U.S. Pat. No. 4,152,129. However, because of the possible crystallization of carbon dioxide and/or because of critical conditions at the top of the column, such a process does not allow achieving the carbon dioxide strictest requirements. A finishing processing, for example implementing amine, is therefore essential in case of a very strict carbon dioxide requirement. In addition, this method is difficult to implement in a modular way.

Another type of processing is the use of semipermeable membrane modules. The applications of these membrane modules for gases with medium carbon dioxide content have greatly developed in recent years. In general, the required membrane surface depends on the composition of the natural gas to be processed, the gas pressure at the modules inlet as well as the permeate pressure. Membrane module processing is advantageous for relatively high carbon dioxide concentrations and for a certain range of "inlet/permeate" partial pressure ratios. It is also possible to provide several processing levels per membrane module to concentrate the carbon dioxide in the permeate, requiring to provide intermediate permeate compressions. Carbon dioxide reinjection requires an additional compression, from the low pressure of the final permeate, further increasing the energy bill for this kind of processes.

In practice, systems with two processing levels arranged in series are frequently used, each of the levels comprising a plurality of membrane modules. These systems have two possible operating modes, each of which having advantages and disadvantages.

According to the retentate mode ("retentate series"), as shown in FIG. 1a, the first processing level extracts carbon dioxide at a moderate rate so as not to drag along too much natural gas such as methane in order to reach the required purity of carbon dioxide. The obtained retentate comprising a large fraction of carbon dioxide is sent to the second processing level in which the carbon dioxide is extracted at a high rate to obtain a retentate of satisfactory purity. A significant amount of natural gas from the second processing level passes into the permeate. The carbon dioxide thereby produced does not meet the required specifications and, after compression, is recycled to the inlet of the first processing level.

According to the permeate mode ("permeate series"), as shown in FIG. 1b, the first processing level allows a significant extraction of carbon dioxide so as to directly obtain a natural gas fraction having the required specifications. This first processing level results in a significant loss of natural gas in the permeate which is collected in the second processing level after compression. The production of permeate is limited so as not to affect the purity of the carbon dioxide produced in the second permeate. The produced retentate is therefore a mixture that does not satisfy any of the natural gas and carbon dioxide purity requirements and is recycled into the first processing level inlet.

It is very common to use two-level processes such as described above when the methane and carbon dioxide purity requirements become somewhat restrictive.

The fraction of gas passing through the membrane and the resulting retentate and permeate compositions depend on the relative partial pressures of $CO_2$, methane and other constituents of the gas to be processed. As a consequence, the second processing level supply also depends on the composition of the feed gas.

It can thus be seen that in both cases, calculating the membrane surface to be installed, as well as the composition of all flows in the process, depends on the composition of the feed gas.

Calculating the membrane surface leads to a certain initial sizing of the installation at the beginning of the field life, which may not always be compatible with the subsequent evolution in the gas composition. It is therefore necessary to provide for processing levels arrangements which allow taking into account the evolution in the feed gas composition.

With regard to the retentate mode, the increase in the carbon dioxide content in the feed gas is handled by increasing the membrane surface of the first processing level. However, the surface becomes so large that the gas is sufficiently purified to reduce the need for membrane surface at the second processing level, resulting in a membrane availability excess as the carbon dioxide content in the feed gas increases. In other words, the installed surface of the second processing level becomes partly unused because the natural gas which has been purified at the first processing level requires less processing at the second processing level.

Moreover, while the total amount of energy consumed in the processing unit remains constant, its distribution between the recycling compressor and the compressor for carbon dioxide injection into the deposit substantially varies, thereby complicating the design of the machines.

With regard to the permeate mode, it is the membrane surface of the second processing level that must be increased to compensate for the increase in the carbon dioxide content in the natural gas to be processed. The surface required for the first processing level eventually decreases, so that the total required surface varies substantially less than in the retentate mode, so that the installed surface is almost fully used regardless of the evolution in carbon dioxide content in the feed gas and allows for efficient use of the implemented membrane surface.

However, the amount of energy required for permeate compression increases sharply, as does the power for the compressor for compressing the produced carbon dioxide, as the carbon dioxide content in the natural gas increases. Compressors are therefore not used optimally over time.

The main drawback of these two operating modes is that they do not take into account the evolution in the composition of the natural gas to be processed resulting in either energy overconsumption or membrane surface oversizing. Indeed, the initial design of a processing level at the beginning of the field life may not always be in line with the subsequent evolution in the composition of the natural gas.

There is therefore a need to develop a method for processing a natural gas originating from a deposit, of which the carbon dioxide content evolves over time, the processing method being optimized from an energy consumption point of view and allowing extracting a fraction of carbon dioxide of sufficient quality to be reinjected into the deposit and a fraction of natural gas meeting the required specifications.

SUMMARY OF THE INVENTION

According to a first aspect, the invention relates to a method for processing a natural gas containing carbon dioxide in an installation that comprises a plurality of membrane modules, a part of the membrane modules being assigned to a first processing level defining a membrane surface and another part of the membrane modules being assigned to a second processing level defining a membrane surface, the first processing level and the second processing level being fluidly connected in a retentate mode or in a permeate mode, wherein when one of the processing levels requires less membrane surface for gas processing and the other processing level requires more membrane surface for gas processing, then the method comprises a reassignment step reassigning at least one membrane module assigned from the processing level requiring less membrane surface to the processing level requiring more membrane surface.

The method for processing a natural gas of the present invention allows overcoming the disadvantages of the state of the art. Indeed, the need for membrane surface of the processing levels is based on the carbon dioxide content in the natural gas to be processed, this content being brought to change over time. The method according to the present invention makes it possible to modulate and optimize the membrane surface required by each processing level for the processing of a natural gas, based on the evolution in the carbon dioxide content in this natural gas while limiting the number of membrane modules to be provided for the entire installation. In other words, the optimization of the membrane processing of a natural gas according to the invention is carried out by adapting the membrane surface of the two processing levels by transferring at least one membrane module from a level requiring less membrane surface to another level requiring more membrane surface.

In addition, the membrane modules number of the level requiring less membrane surface to be reassigned to the level requiring more membrane surface may depend on the carbon dioxide content in the natural gas, in particular on the increase thereof. Furthermore, the membrane modules number of the level requiring less membrane surface to be reassigned to the level requiring more membrane surface may depend on the evolution in the natural gas pressure.

According to the processing method of the invention, the two processing levels can be fluidly connected in retentate mode and the installation can furthermore comprise:
a natural gas supply line;
a transfer inlet line;
a permeate collection line;
a retentate collection line;
a permeate transfer line;
a retentate transfer line;
each of the membrane modules comprising an inlet, a permeate outlet and a retentate outlet;

wherein, in the first processing level, all of the module inlets are fluidly connected to the supply line, all of the permeate outlets are fluidly connected to the permeate collection line, and all of the retentate outlets are fluidly connected to the retentate transfer line, the latter being fluidly connected to the transfer inlet line;

wherein, in the second processing level, all of the module inlets are fluidly connected to the transfer inlet line, all of the retentate outlets are fluidly connected to the retentate collection line, and all of the permeate outlets are fluidly connected to the permeate transfer line, the latter being fluidly connected to the supply line;

wherein the required membrane surface for the first processing level increases and the membrane surface required for the second processing level decreases, the step of reassigning from the second processing level to the first processing level comprising:
fluidly disconnecting the inlet, the retentate outlet and the permeate outlet of the membrane module(s) to be reassigned;
fluidly connecting the inlet of the membrane module(s) to be reassigned to the supply line;
fluidly connecting the permeate outlet of the membrane module(s) to be reassigned to the permeate collection line, and
fluidly connecting the retentate outlet of the membrane module(s) to be reassigned to the retentate transfer line.

According to the processing method of the invention, the two processing levels can be fluidly connected in permeate mode and the installation can furthermore comprise:
- a natural gas supply line;
- a transfer inlet line;
- a permeate collection line;
- a retentate collection line;
- a permeate transfer line;
- a retentate transfer line;

each of the membrane modules comprising an inlet, a permeate outlet and a retentate outlet;

wherein, in the first processing level, all of the module inlets are fluidly connected to the supply line, all of the retentate outlets are fluidly connected to the retentate collection line, and all of the permeate outlets are fluidly connected to the permeate transfer line, the latter being fluidly connected to the transfer inlet line;

wherein, in the second processing level, all of the module inlets are fluidly connected to the transfer inlet line, all of the permeate outlets are fluidly connected to the permeate collection line, and all of the retentate outlets are fluidly connected to the retentate transfer line, the latter being fluidly connected to the supply line;

wherein the membrane surface required for the second processing level increases and the membrane surface required for the first processing level decreases, the step of reassigning from the first processing level to the second processing level comprising:

fluidly disconnecting the inlet, the permeate outlet and the retentate outlet of the membrane module(s) to be reassigned;

fluidly connecting the inlet of the membrane module(s) to be reassigned to the transfer inlet line;

fluidly connecting the retentate outlet of the membrane module(s) to be reassigned to the retentate transfer line, and fluidly connecting the permeate outlet of the membrane module(s) to be reassigned to the permeate collection line.

According to a second aspect, the invention relates to a method for processing a natural gas containing carbon dioxide in an installation which comprises membrane modules, a part of the membrane modules being assigned to a first processing level defining a membrane surface and another part of the membrane modules being assigned to a second processing level defining a membrane surface;

in a retentate mode, the first processing level and the second processing level being fluidly connected in retentate mode;

in a permeate mode, the first processing level and the second processing level being fluidly connected in permeate mode;

the natural gas processing is carried out according to the retentate mode, then when the content in carbon dioxide present in the natural gas reaches a given value, the processing of the natural gas is carried out according to the permeate mode, or the natural gas processing is carried out according to the permeate mode, then when the content in carbon dioxide present in the natural gas reaches a given value, the processing of natural gas is carried out according to the retentate mode.

Thanks to the processing method according to the second aspect of the invention, the natural gas processing according to the invention can advantageously be optimized by adapting the operating mode to be followed during processing, in particular by sequentially switching from one operating mode to another more economical operating mode for processing a natural gas based on the carbon dioxide content evolution in the natural gas, that is, switching from the retentate mode to the permeate mode and vice versa.

According to the processing method of the second aspect of the invention, the installation can comprise:
- a natural gas supply line;
- a transfer inlet line;
- a permeate collection line;
- a retentate collection line;
- a permeate transfer line;
- a retentate transfer line;

and each of the membrane modules comprising an inlet, a permeate outlet and a retentate outlet, the first processing level and the second processing level being connected in permeate series so that:

in the first processing level, all of the module inlets are fluidly connected to the supply line, all of the retentate outlets are fluidly connected to the retentate collection line, and all of the permeate outlets are fluidly connected to the permeate transfer line, the latter being fluidly connected to the transfer inlet line;

in the second processing level, all of the module inlets are fluidly connected to the transfer inlet line, all of the permeate outlets are fluidly connected to the permeate collection line, and all of the retentate outlets are fluidly connected to the retentate transfer line, the latter being fluidly connected to the supply line;

wherein, switching from the permeate mode to the retentate mode is carried out as follows:

fluidly disconnecting the inlet, the permeate outlet and the retentate outlet of the membrane modules;

and fluidly connecting the inlet, the permeate outlet and the retentate outlet of at least a part of the membrane modules so that:

in the first processing level, all of the module inlets are fluidly connected to the supply line, all of the permeate outlets are fluidly connected to the permeate collection line, and all of the retentate outlets are fluidly connected to the retentate transfer line, the latter being fluidly connected to the transfer inlet line;

in the second processing level, all of the module inlets are fluidly connected to the transfer inlet line, all of the retentate outlets are fluidly connected to the retentate collection line, and all of the permeate outlets are fluidly connected to the permeate transfer line, the latter being fluidly connected to the supply line.

Alternatively, or additionally, in the method according to the invention, the implemented installation may further comprise a compressor adapted to compress the permeate collected in the permeate transfer line.

Alternatively, or additionally, the processing of the natural gas containing a certain carbon dioxide content requires a required total membrane surface $S_r$, the membrane modules providing a total available surface, wherein when the total available membrane surface exceeds the total surface required for the separation of the carbon dioxide, the permeate pressure can be increased on any of the levels of the unit.

In the method according to the invention the increase in permeate pressure can be achieved by:
- decreasing the rotational speed of the compressor; or
- orienting the blades of the compressor.

Advantageously, the natural gas processing method according to the invention also allows the permeate pressure to be adjusted in order to make maximum use of the membrane surface installed at the processing levels and to reduce the energy consumption of this installation.

In addition, the natural gas processing method according to the invention is particularly advantageous when the content of the carbon dioxide present in the natural gas to be processed increases with time.

According to a third aspect, the invention also relates to an installation for processing a natural gas containing carbon dioxide, comprising:
- a supply line;
- a transfer inlet line;
- a permeate collection line;
- a retentate collection line;
- a permeate transfer line;
- a retentate transfer line;
- a plurality of membrane modules, each of the membrane modules comprising an inlet fluidly connectable to the supply line and the transfer inlet line, a retentate outlet fluidly connectable to the retentate collection line and the retentate transfer line, and a permeate outlet fluidly connectable to the permeate collection line and the permeate transfer line, each of the membrane modules being fluidly isolable from the lines; and
- a valve system adapted to assign a part of the membrane modules to a first processing level and another part of the membrane modules to a second processing level so that:

according to a retentate mode in retentate series:
  in the first processing level, all of the module inlets are fluidly connected to the supply line, all of the permeate outlets are fluidly connected to the permeate collection line, and all of the retentate outlets are fluidly connected to the retentate transfer line, the latter being fluidly connected to the transfer inlet line;
  in the second processing level, all of the module inlets are fluidly connected to the transfer inlet line, all of the retentate outlets are fluidly connected to the retentate collection line, and all of the permeate outlets are fluidly connected to the permeate transfer line, the latter being fluidly connected to the supply line;

according to a permeate mode in permeate series:
  in the first processing level, all of the module inlets are fluidly connected to the supply line, all of the retentate outlets are fluidly connected to the retentate collection line, and all of the permeate outlets are fluidly connected to the permeate transfer line, the latter being fluidly connected to the transfer inlet line;
  in the second processing level, all of the module inlets are fluidly connected to the transfer inlet line, all of the permeate outlets are fluidly connected to the permeate collection line, and all of the retentate outlets are fluidly connected to the retentate transfer line, the latter being fluidly connected to the supply line.

BRIEF DESCRIPTION OF THE DRAWINGS

In FIGS. 3a to 3c and 4a to 4c, the closed valves are shown in black and the open valves in white, the used lines are in solid lines while the unused lines are in dashed lines.

Figure 1A:
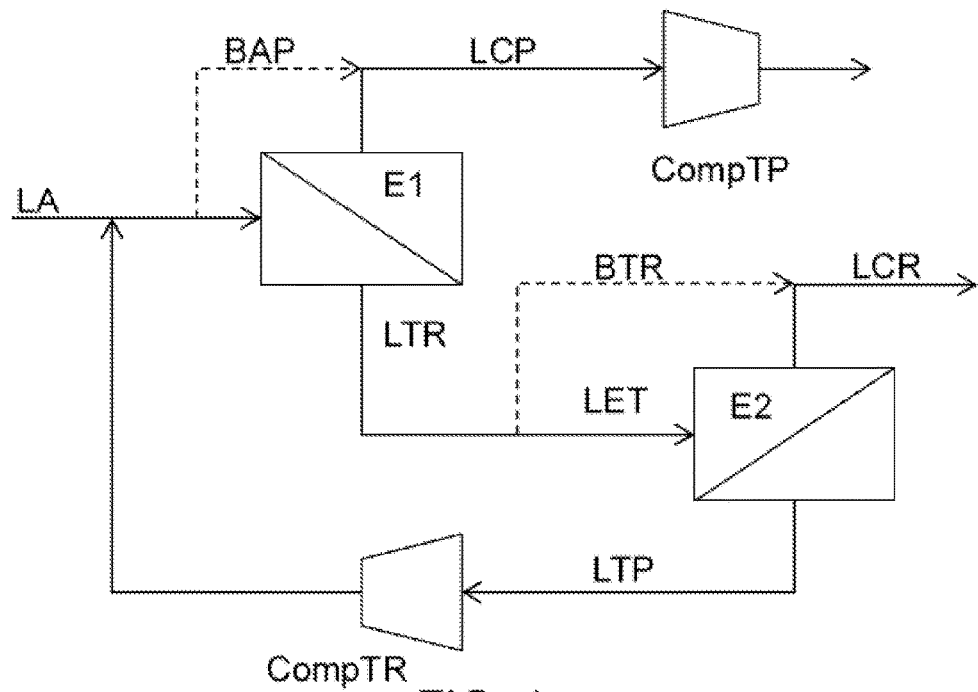
FIG. 1a schematically shows a conventional installation in a retentate series operating mode in which the first processing level and the second processing level are fluidly connected in retentate mode.
Figure 1B:
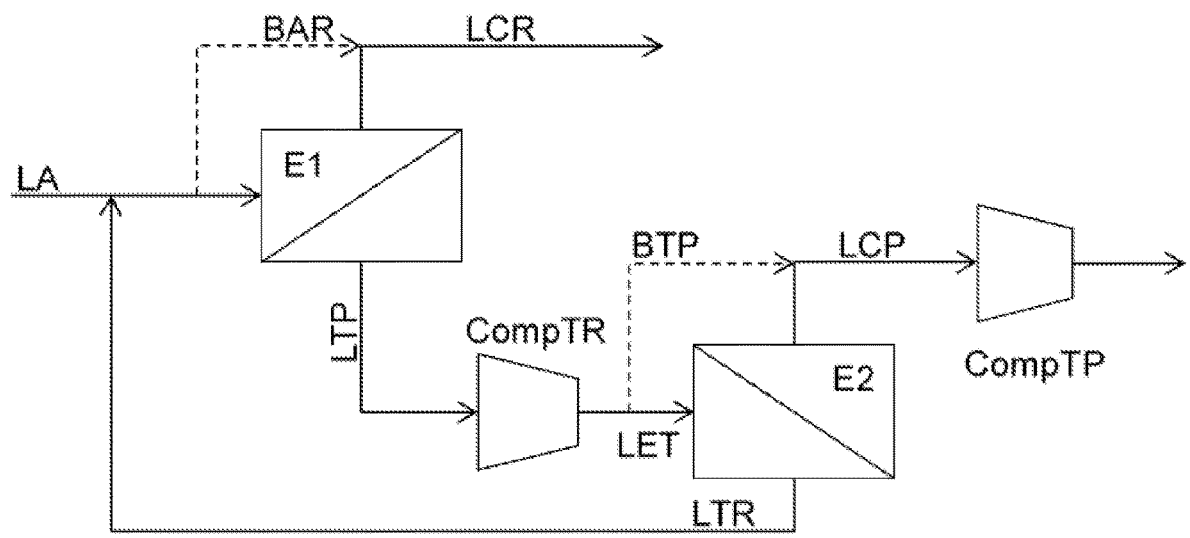
FIG. 1b schematically shows a conventional installation in a permeate series operating mode in which the first processing level and the second processing level are fluidly connected in permeate mode.

The invention is now described with reference to non-limiting FIGS. 1 to 5.

DETAILED DESCRIPTION OF PREFERRED EMBODIMENTS OF THE INVENTION

1. The Installation

An installation for processing a natural gas containing $CO_2$ according to the invention is described below with reference to FIG. 2. The installation I comprises:
- a plurality of membrane modules M;
- a supply line LA;
- a transfer inlet line LET;
- a permeate collection line LCP;
- a retentate collection line LCR;
- a permeate transfer line LTP;
- a retentate transfer line LTR; and
- a valve system SV.

Each of the membrane modules M comprises an inlet EM fluidly connectable to the supply line LA and to the transfer inlet line LET, a retentate outlet SR fluidly connectable to the retentate collection line LCR and to the retentate transfer line LTR, and a permeate outlet SP fluidly connectable to the permeate collection line LCP and the permeate transfer line LTP. Each of the membrane modules M is fluidly isolatable from the lines.

The valve system SV is adapted to assign a part of the membrane modules M to a first processing level E1 and another part of the membrane modules M to a second processing level E2 according to a series operating mode of the retentate (or "retentate mode") or a series operating mode of the permeate (or "permeate mode").

For the purposes of the present invention, the term "membrane module" means a unit comprising an inlet EM, a permeate outlet SP and a retentate outlet SR which are connectable to lines described above. Each of the membrane modules M may comprise one or more membrane elements connected in series or in parallel and allowing purifying the natural gas by separating it from the impurities comprises therein, in particular from $CO_2$. A membrane module M is thus the smallest gas permeation object that can be isolated from the others, in particular by the valve system SV.

Typically, the membrane module M may be a dead-end membrane separation module, a tangential membrane separation module with co-current flow, a counterflow tangential membrane separation or a cross-flow tangential membrane separation.

Typically, a membrane module M is made up of one or more membrane elements that can be chosen from a spiral planar membrane or a hollow fiber membrane.

Such an installation I allows both the assignment of membrane modules M to one or other of the processing levels E1, E2, the reassignment to one of the processing levels of one or more membrane modules M previously assigned to the other of the processing levels according to the evolution in the operating parameters, and the operating mode switch between a retentate mode or a permeate mode.

The valve system SV may further comprise for each of the membrane modules M:
- a supply-module pipe CAM fixed at one end thereof to the supply line LA and at the other end thereof to the inlet EM of the membrane module M, the supply-module pipe CAM comprising a valve VAM for controlling the flow rate therein, including obstruction thereof;
- a transfer-module pipe CTM fixed at one end thereof to the transfer inlet line LET and at the other end thereof to the inlet EM of the membrane module M, the transfer-module pipe CTM comprising a valve VTM for controlling the flow rate therein, including obstruction thereof;
- a retentate module-transfer pipe CTR fixed at one end thereof to the retentate outlet SR of the membrane module M and fixed at the other end thereof to the retentate transfer line LTR, the retentate module-transfer pipe CTR comprising a valve VTR for controlling the flow rate of the retentate circulating therein, including obstruction thereof;
- a retentate module-collection pipe CCR fixed at one end thereof to the retentate outlet SR of the membrane module M and fixed at the other end thereof to the retentate collection line LCR, the retentate module-collection pipe CCR comprising a valve VCR for controlling the flow rate of the retentate circulating therein, including obstruction thereof;
- a permeate module-transfer pipe CTP fixed at one end thereof to the permeate outlet SP of the membrane module M and fixed at the other end thereof to the permeate transfer line LTP, the permeate module-transfer pipe CTP comprising a valve VTP for controlling the flow of permeate circulating therein, including obstruction thereof; and
- a permeate module-collection pipe CCP fixed at one end thereof to the permeate outlet SP of the membrane module M and fixed at the other end thereof to the permeate collection line LCP, the permeate module-collection pipe CCP comprising a valve VCP for controlling the flow of permeate circulating therein, including obstruction thereof.

The valve system SV may further include:
- a retentate transfer-supply pipe CAR fixed at one end thereof to the retentate transfer line LTR and at the other end thereof to the supply line LA, the retentate transfer-supply pipe CAR comprising a valve VAR for controlling the flow rate of the retentate circulating therein, including obstruction thereof;
- a retentate transfer-inlet pipe CER fixed at one end thereof to the retentate transfer line LTR and at the other end thereof to the transfer inlet line LET, the retentate transfer-inlet pipe CER comprising a valve VER for controlling the flow rate of the retentate circulating therein, including obstruction thereof;
- a permeate transfer-supply pipe CAP fixed at one end thereof to the permeate transfer line LTP and at the other end thereof to the supply line LA, the permeate transfer-supply pipe CAP comprising a valve VAP for controlling the flow of permeate circulating therein, including obstruction thereof; and
- a permeate transfer-inlet pipe CEP fixed at one end thereof to the permeate transfer line LTP and at the other end thereof to the transfer inlet line LET, the permeate transfer-inlet pipe CEP comprising a valve VEP allowing the control of the permeate flow circulating therein, including obstruction thereof.

Typically, each valve may be selected from a gate valve, a check valve, a ball valve, a poppet valve, a butterfly valve, a piston valve, a needle valve and a diaphragm valve. Preferably, the valves mentioned above are all-or-nothing valves (with the exception of the bypass lines valves if they are provided, such valves being preferably valves for flow rate regulation, including obstruction thereof).

The valves mentioned above are advantageously electrically controlled. In such a case, the valve system SV may further include a valve control for electrically controlling valve opening and closing. Preferably, the valves are coupled in pairs so that if one of them is open, the other is closed. Paired couplings are:
for each membrane module M in operating mode:
  VAM and VTM valves;
  VTR and VCR valves;
  VTP and VCP valves;
VAR and VER valves; and
VAP and VEP valves.

In addition, for each of the membrane modules M, the valves VTR, VCR, VTP, and VCP can also be coupled together so that only one or the other of the following configurations can be achieved when the corresponding membrane module M is in operating mode:
the valves VTR and VCP are open, the valves VTP and VCR are closed; and
the valves VTP and VCR are open, the valves VTR and VCP are closed.

Typically, the installation I may further comprise a recycling compressor CompTR in the permeate transfer line LTP in order to compress the permeate collected therein. According to the retentate mode, the recycling compressor CompTR is adapted to increase the pressure of the permeate collected via the permeate outlet SP of the membrane module M of the second processing level E2 in the permeate transfer line LTP, wherein this compressed permeate can then be injected into the membrane module M of the first processing level E1. According to the permeate mode, the recycling compressor CompTR is adapted to increase the pressure of the permeate collected via the permeate outlet SP of the membrane module M of the first processing level E1 in the permeate transfer line LTP, wherein this compressed permeate can then be injected into the membrane module M of the second processing level E2.

Typically, the installation I may further comprise a reinjection compressor CompTP in the permeate collection line LCP for compressing the permeate collected therein. This compressed permeate comprising $CO_2$ can then be injected into an oil deposit. According to the retentate mode, the reinjection compressor CompTP is adapted to increase the pressure of the permeate collected via the permeate outlet SP of the membrane module M of the first processing level E1 in the permeate collection line LCP, wherein this compressed permeate can then be reinjected into the gas deposit. According to the permeate mode, the reinjection compressor CompTP is adapted to increase the pressure of the permeate collected via the permeate outlet SP of the membrane module M of the second processing level E2 in the permeate collection line LCP, wherein this compressed permeate can then be reinjected into the gas field.

For the purposes of the present invention, the term "compressor" means a device for increasing the pressure of a gas. Typically, the first and second compressors may be rotary compressors comprising blades separately selected from a centrifugal compressor, an axial compressor or a helical compressor.

Furthermore, the facility I may also include at least one of:
a bypass line BAP for bypassing the membrane modules directly connecting the supply line LA to the permeate collection line LCP (bypass BAP) for collecting a part of the gas present in the supply line and bringing it directly to the permeate collection line;
a bypass line BAR for bypassing the membrane modules directly connecting the supply line LA to the retentate collection line LCR (bypass BAR) for collecting a part of the gas present in the supply line LA and bringing it directly to the retentate collection line LCR;
a bypass line BTP of the membrane modules directly connecting the transfer inlet line LET to the permeate collection line LCP (bypass BTP) for collecting a part of the gas present in the transfer inlet line LET and bringing it directly to the permeate collection line LCP; and
a bypass line BTR of the membrane modules directly connecting the transfer inlet line LET to the retentate collection line LCR (bypass BTR) for collecting a part of the gas present in the transfer inlet line LET and bringing it directly to the retentate collection line LCR.

To carry out such bypasses, there are several possibilities.

According to the first and most direct option, each bypass comprises a pipe and a corresponding valve:
the ends of the bypass BAP pipe are connected to the supply line LA and the permeate collection line LCP;
the ends of the bypass BAR pipe are connected to the supply line LA and to the collection line of retentate LCR;
the ends of the bypass BTP pipe are connected to the transfer inlet line LET and the permeate collection line LCP; and
the ends of the bypass BTR pipe are connected to the transfer inlet line LET and the retentate collection line LCR.

Figure 2:
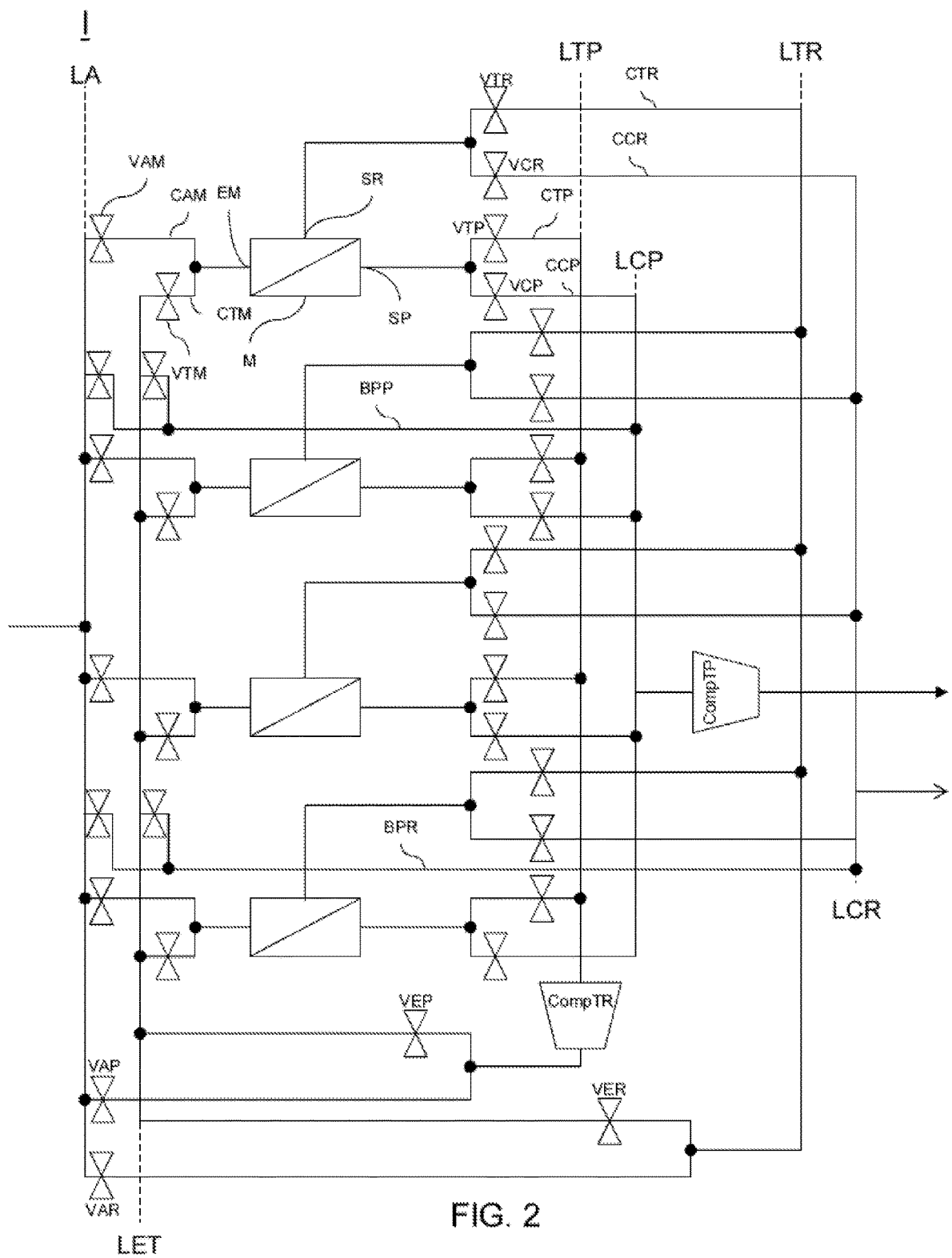
FIG. 2 schematically shows an installation for implementing the method according to the present invention according to certain embodiments.

According to a second option shown in FIG. 2:
the bypass BAP and bypass BTP share a bypass pipe BPP leading to the permeate collection line LCP, one end thereof being connected to this permeate collection line LCP, the other end thereof being bifurcated to connect to both the supply line LA and the transfer inlet line LET, a valve being provided on each of the bifurcations; and
the bypass BAR and bypass BTR share a bypass pipe BPR leading to the retentate collection line LCR, one end thereof being connected to this retentate collection line LCR, the other end thereof being bifurcated to connect to both the supply line LA and the transfer inlet line LET, a valve being provided on each of the bifurcations.

According to a third option:
the bypass BAP and bypass BAR share a bypass pipe from the supply line LA, one end thereof being connected to this supply line LA, the other end thereof being bifurcated to connect to both the permeate collection line LCP and the retentate collection line LCR, a valve being provided on each of the bifurcations; and
the bypass BTP and bypass BTR share a bypass pipe from the transfer inlet line LET, one end thereof being connected to this transfer inlet line LET, the other end thereof being bifurcated to connect to both the permeate collection line LCP and the retentate collection line LCR, a valve being provided on each of the bifurcations.

1.1. Operation in Retentate Mode

Figure 3A:
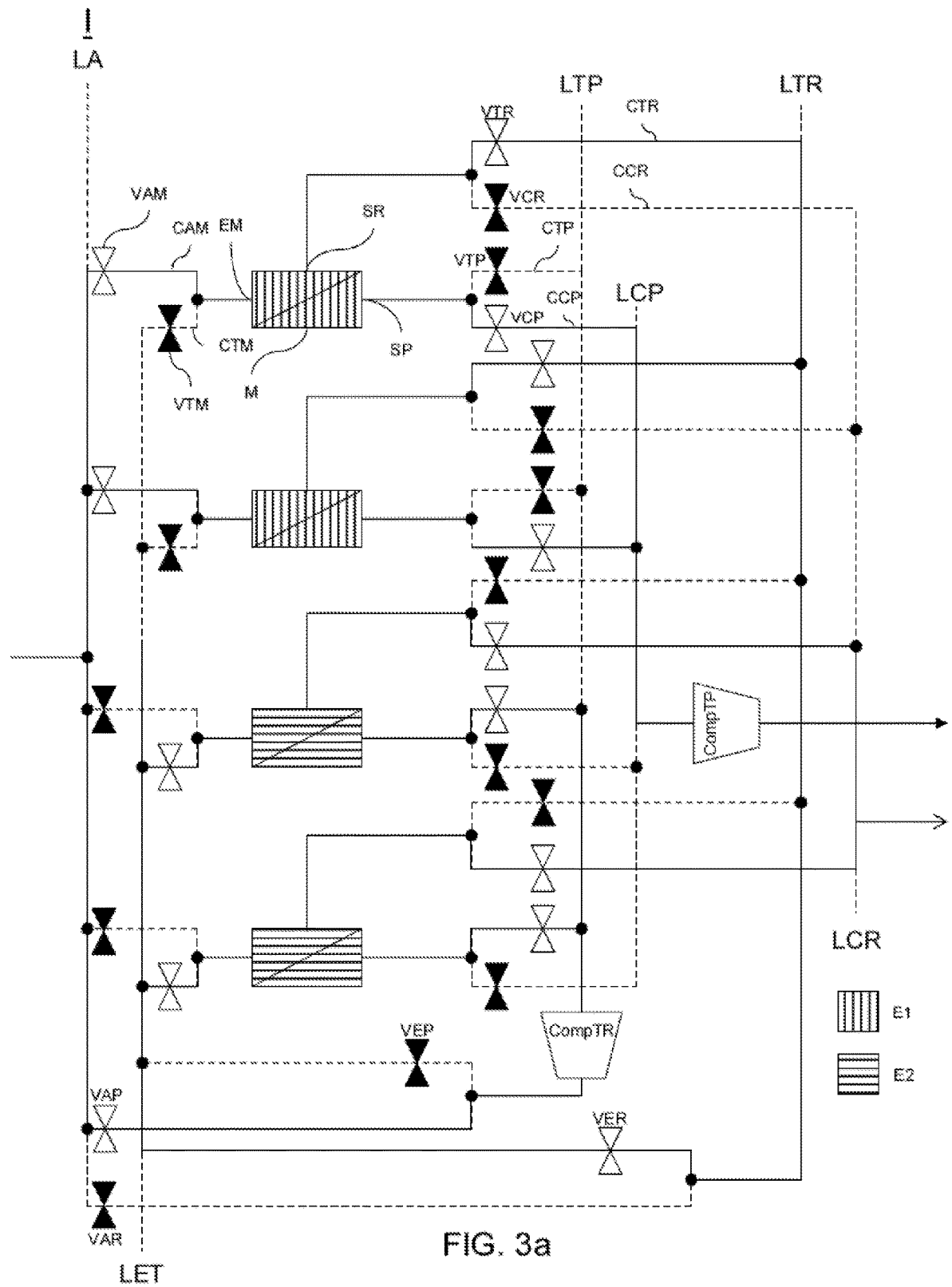
FIGS. 3a, 3b and 3c schematically represent an installation for carrying out the method according to the present invention, according to certain embodiments, in which the first processing level and the second processing level are fluidly connected in retentate mode, and in which a membrane module of the second processing level is reassigned to the first processing level.
Figure 3B:
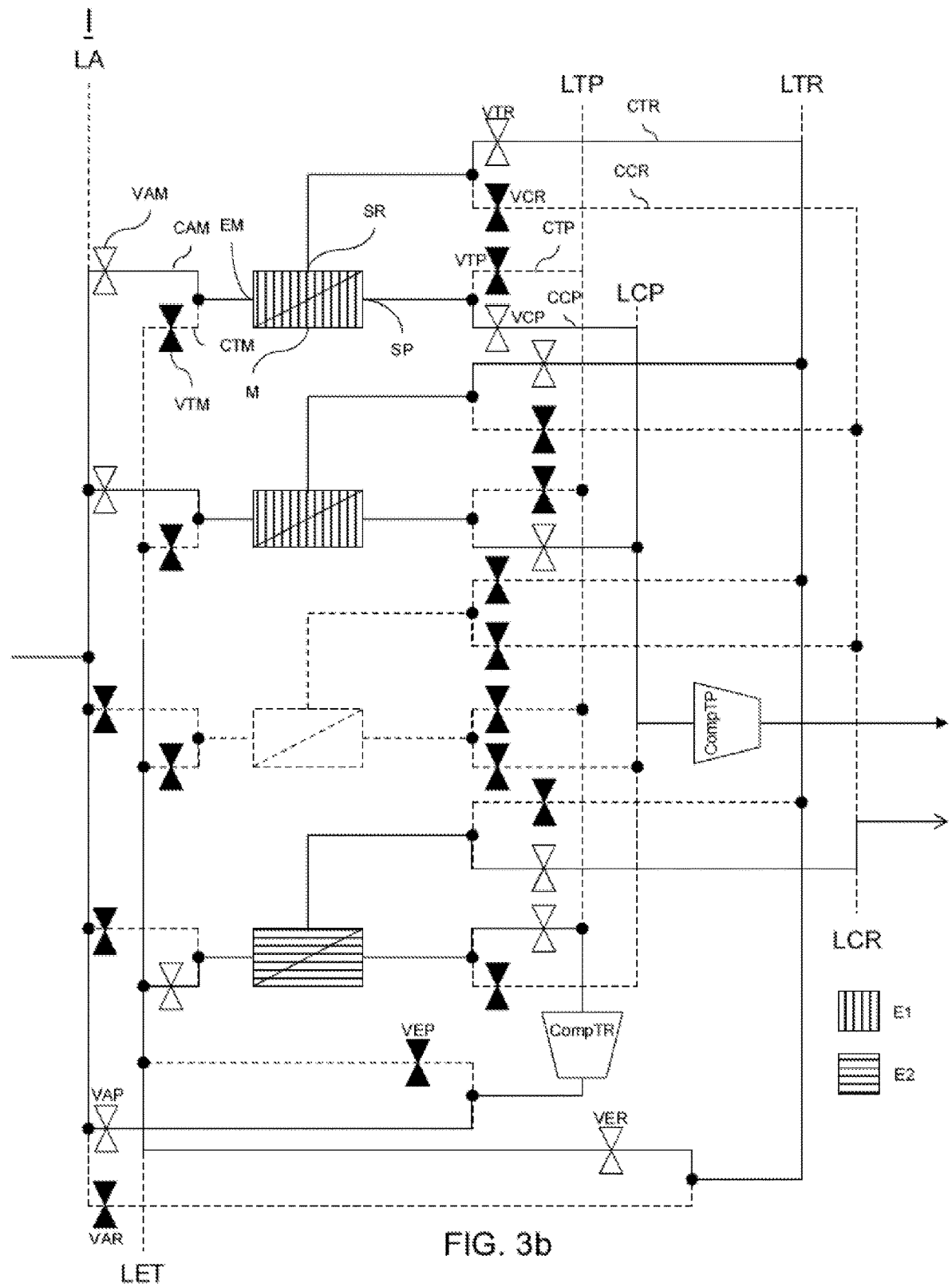
Figure 3C:
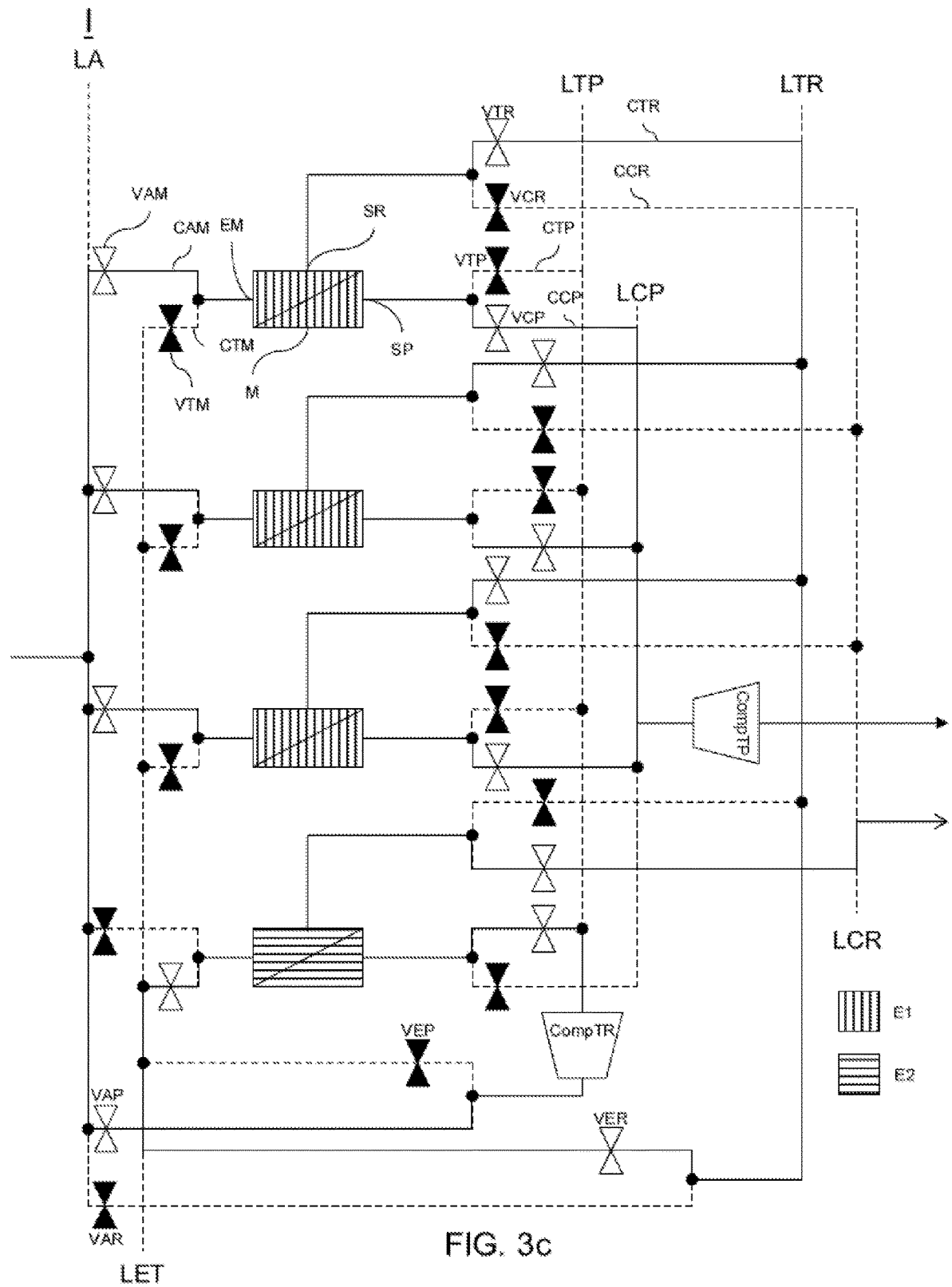

The assignment of the membrane modules M in the retentate mode is carried out in the following manner (see FIGS. 1a and 3a).

In the first processing level E1, all of the inlets EM of the membrane modules M are fluidly connected to the supply line LA, all of the permeate outlets SP are fluidly connected to the permeate collection line LCP, and all of the retentate outlets SR are fluidly connected to the retentate transfer line LTR, the latter being fluidly connected to the transfer inlet line LET.

The assignment of membrane modules M to the first processing level E1 can be easily performed by:
opening the valves allowing the fluidic connection between:
the inlet EM of the membrane modules M and the supply line LA→VAM;
the retentate outlet SR of the membrane modules M and the retentate transfer line LTR→VTR;
the permeate outlet SP of the membrane modules M and the permeate collection line LCP→VCP;
closing the valves allowing the fluidic connection between:
the inlet EM of the membrane modules and the LET→VTM transfer inlet line;
the retentate outlet SR of the membrane modules and the retentate collection line LCR→VCR;
the permeate outlet SP of the membrane modules M and the permeate transfer line LTP→VTP.

In the second processing level E2, all of the inlets EM of the membrane modules M are fluidly connected to the transfer inlet line LET, all of the retentate outlets SR are fluidly connected to the retentate collection line LCR, and all of the permeate outlets SP are fluidly connected to the permeate transfer line LTP, the latter being fluidly connected to the supply line LA.

The assignment of membrane modules M to the second processing level E2 can be easily performed by:

opening the valves allowing the fluidic connection between:
- the inlet EM of the membrane modules M and the transfer inlet line LET→VTM;
- the retentate outlet SR of the membrane modules M and the retentate collection line LCR→VCR;
- the permeate outlet SP of the membrane modules M and the permeate transfer line LTP→VTP;

closing the valves allowing the fluidic connection between:
- the inlet EM of the membrane modules M and the supply line LA→VAM;
- the retentate outlet SR of the membrane modules M and the retentate transfer line LTR→VTR;
- the permeate outlet SP of the membrane modules M and the permeate collection line LCP→VCP.

In other, more general terms, in the retentate mode, the retentate outlets SR of the membrane modules M of the first processing level E1 are fluidly connected to the inlets EM of the membrane modules M of the second processing level E2.

Table 1 below summarizes the different connections in the retentate mode.

TABLE 1

Retentate mode connections summary.

| Processing Level | Module Inlet | Retentate Outlet | Permeate Outlet |
|---|---|---|---|
| E1 | LA | LTR (transfer) | LCP (collection) |
| E2 | LET | LCR (collection) | LTP (transfer) |

Table 2 summarizes the open or closed state of the valves in the retentate mode.

TABLE 2

Retentate mode open or closed states summary.

| Valves | Retentate mode |
|---|---|
| VAR | • |
| VAP | ○ |
| VER | ○ |
| VEP | • |

| | E1 | E2 | Unassigned membrane modules |
|---|---|---|---|
| VAM | ○ | • | • |
| VTM | • | ○ | • |
| VTR | ○ | • | • |
| VCR | • | ○ | • |
| VTP | • | ○ | • |
| VCP | ○ | • | • |

'○' indicates that the valve is open;
'•' indicates that the valve is closed 1.2 Operation in Permeate Mode The assignment of the membrane modules M in the permeate mode is carried out in the following manner (see FIGS. 1b and 4a).

In the first processing level E1, all of the inlets EM of the membrane modules M are fluidly connected to the supply line LA, all of the retentate outlets SR are fluidly connected to the retentate collection line LCR, and all of the permeate outlets SP are fluidly connected to the permeate transfer line LTP, the latter being fluidly connected to the transfer inlet line LET.

The assignment of membrane modules M to the first processing level E1 can be easily performed by:

opening the valves allowing the fluidic connection between:
- the inlet EM of the membrane modules M and the supply line LA→VAM;
- the retentate outlet SR of the membrane modules M and the retentate collection line LCR→VCR;
- the permeate outlet SP of the membrane modules M and the permeate transfer line LTP→VTP;

closing the valves allowing the fluidic connection between:
- the inlet EM of the membrane modules M and the transfer inlet line LET→VTM;
- the retentate outlet SR of the membrane modules M and the retentate transfer line LTR→VTR;
- the permeate outlet SP of the membrane modules M and the permeate collection line LCP→VCP.

In the second processing level E2, all of the inlets EM of the membrane modules M are fluidly connected to the transfer inlet line LET, all of the permeate outlets SP are fluidly connected to the permeate collection line LCP, and all of the retentate outlets SR are fluidly connected to the retentate transfer line LTR, the latter being fluidly connected to the supply line LA.

The assignment of membrane modules M to the second processing level E2 can be easily performed by:

opening the valves allowing the fluidic connection between:
- the inlet EM of the membrane modules M and the transfer inlet line LET→VTM;
- the retentate outlet SR of the membrane modules M and the retentate transfer line LTR→VTR;
- the permeate outlet SP of the membrane modules M and the permeate collection line LCP→VCP;

closing the valves allowing the fluidic connection between:
- the inlet EM of the membrane modules M and the supply line LA→VAM;
- the retentate outlet SR of the membrane modules M and the retentate collection line LCR→VCR;
- the permeate outlet SP of the membrane modules M and the permeate transfer line LTP→VTP.

In other, more general terms, in the permeate mode, the permeate outlets SP of the membrane modules M of the first processing level are fluidly connected to the module inlets EM of the membrane modules M of the second processing level E2.

Table 3 summarizes the different connections in the permeate mode.

TABLE 3

Permeate mode connections summary.

| Processing level | Module inlet | Retentate outlet | Permeate outlet |
|---|---|---|---|
| E1 | LA | LCR (collection) | LTP (transfer) |
| E2 | LET | LTR (transfer) | LCP (collection) |

Table 4 summarizes the open or closed state of the valves in the permeate mode.

TABLE 4

Permeate mode open or closed state summary.

| Valves | Permeate mode |
|---|---|
| VAR | o |
| VAP | • |
| VER | • |
| VEP | o |

| | E1 | E2 | Unassigned membrane modules |
|---|---|---|---|
| VAM | o | • | • |
| VTM | • | o | • |
| VTR | • | o | • |
| VCR | o | • | • |
| VTP | o | • | • |
| VCP | • | o | • |

'o' indicates that the valve is open;
'•' indicates that the valve is closed

2. Methods (Common Steps)

The present invention relates to a method for processing a natural gas containing carbon dioxide in an installation I which comprises a plurality of membrane modules M, for example as described above.

For the purposes of the present invention, the term "natural gas" shall be understood as meaning a gas mix comprising hydrocarbons such as methane, ethane, propane and butane and impurities such as carbon dioxide ($CO_2$). Typically, the $CO_2$ content in the natural gas to be processed through the method of the present invention may be from 10 mol % to 80 mol %. In most cases, this $CO_2$ content in natural gas increases over time. However, the present invention is not limited thereto and can be used also in the case where the $CO_2$ content in natural gas decreases over time, or more generally fluctuates over time.

Generally, the natural gas to be processed by the method according to the present invention is introduced into the membrane module M via the inlet EM. A permeate comprising $CO_2$ is collected at the permeate outlet SP while a retentate comprising the natural gas is collected at the retentate outlet SR. The permeate and the retentate are therefore separately collected at the outlets of the membrane module M thus allowing purification of the natural gas. Advantageously, the collected $CO_2$ can be injected into a petroleum deposit and the purified natural gas can be marketed after optional processings.

Part of the membrane modules M are assigned to a first processing level E1 defining a membrane surface and another part of the membrane modules M are assigned to a second processing level E2 defining a membrane surface. The membrane surface of each of the processing levels necessary for processing the natural gas to be processed depends on the $CO_2$ content in the gas to be processed.

The first processing level E1 and the second processing level E2 can be fluidly connected either in retentate mode or in permeate mode.

Typically, the $CO_2$ content in the natural gas may require a required total membrane surface $S_r$, the membrane modules M providing a total available surface, when the total available membrane surface exceeds the total surface required for the separation of $CO_2$, then the permeate pressure can be increased on any of the levels of the installation I. This pressure increase can be carried out by the recycling compressor CompTR or the reinjection compressor CompTP.

The increase in permeate pressure degrades the driving force (transmembrane pressure difference) which is compensated by using the entire membrane surface instead of the required surface $S_r$ (less than the available surface).

2.1. Operation in Retentate Mode

According to this particular operating mode (FIGS. 1a and 3a), the natural gas to be processed comprising $CO_2$ is introduced into each membrane module M of the first processing level E1 via their inlets EM via the supply line LA. The permeate of the first processing level E1 comprising the $CO_2$ is collected at the permeate outlet SP of each membrane module M of the first processing level E1 in the permeate collection line LCP. The retentate of the first processing level comprising the natural gas and residual $CO_2$ is collected via the retentate outlet SR of each membrane module M of the first processing level E1 in the retentate transfer line LTR. The retentate of the first processing level E1 is then introduced into each membrane module M of the second processing level E2 via their inlets EM through the transfer inlet line LET.

The membrane module(s) M of the second processing level E2 allow improving the purification of natural gas by separating it from residual $CO_2$. Thus, the retentate of the second processing level E2 comprising the purified natural gas is collected via the retentate outlet SR of each membrane module M of the second processing level E2 in the retentate collection line LCR. The permeate of the second processing level E2 comprising the residual $CO_2$ is for its part collected via the permeate outlet SP of each membrane module M of the second processing level E2 in the permeate transfer line LTP. This permeate is then introduced into each membrane module M of the first processing level E1 via the supply line LA to increase the amount of $CO_2$ collected in the permeate collection line LCP.

Typically, when the first processing level E1 and the second processing level of the installation I are fluidly connected in retentate mode, then:
- the permeate of the first processing level E1 may comprise more than 75 mol %. of $CO_2$, in particular from 80 mol %. to 99 mol %. of $CO_2$, especially from 94 mol %. to 97 mol %. $CO_2$, for example about 95 mol %,
- the retentate of the second processing level E2 may comprise more than 75 mol %. natural gas, in particular from 80 mol %. to 99 mol %. natural gas, especially from 94 mol %. to 98 mol %. natural gas.

Advantageously, the permeate of the first processing level E1 comprising $CO_2$ can be reinjected into a petroleum deposit. Likewise, after optional processings, the retentate of the second processing level E2 comprising purified natural gas may be marketed.

Furthermore, the method according to the retentate mode may further comprise increasing the pressure of the permeate collected via the permeate outlet SP of the membrane module M of the second processing level E2 in the permeate transfer line LTP.

In addition, or alternatively, the method according to the retentate mode may further comprise increasing the pressure of the permeate collected via the permeate outlet SP of the membrane module M of the first processing level E1 in the LCP permeate collection line.

2.2 Operation in the Permeate Mode

According to this particular operating mode (FIGS. 1b and 4a), the natural gas to be processed which comprises $CO_2$ is introduced into each membrane module M of the first processing level E1 via their inlet EM through the supply line LA. The retentate of the first processing level E1 which comprises purified natural gas is collected via the retentate outlet SR of each membrane module M of the first processing level E1 in the retentate collecting line LCR. The permeate of the first processing level E1, which comprises $CO_2$ and residual natural gas, is collected via the permeate outlet SP of each membrane module M of the first processing level E1 in the permeate transfer line LTP. This permeate is then introduced into the membrane modules M of the second processing level E2 via their inlet EM via the transfer inlet line LET.

The membrane module(s) M of the second processing level E2 allow reducing the content in residual natural gas in the $CO_2$ by separating the residual natural gas from the $CO_2$. The membrane module(s) M of the second processing level E2 therefore allow improving the quality of the $CO_2$ so that it can be injected into a petroleum deposit. The permeate of the second processing level E2, which comprises $CO_2$, is collected via the permeate outlet SP of each membrane module M of the second processing level E2 in the permeate collection line LCP. The retentate of the second processing level E2, which comprises natural gas, is collected via the outlet of the retentate module SR of each membrane module M of the second processing level E2 in the retentate transfer line LTR. This retentate is then introduced into each membrane module M of the first processing level E1 via the supply line LA to increase the amount of purified natural gas collected in the retentate collection line LCR.

Advantageously, the purified natural gas collected in the retentate collection line LCR may be marketed after possible subsequent processings. The $CO_2$ collected in the permeate collection line LCP can be injected into a petroleum deposit.

Typically, when the first processing level E1 and the second processing level E2 of the installation I are fluidly connected in permeate mode then:
  the permeate of the second processing level E2 may comprise more than 75 mol %. of $CO_2$, in particular from 80 mol %. to 99 mol %. of $CO_2$, especially from 94 mol %. to 97 mol %. $CO_2$,
  the retentate of the first processing level E1 may comprise more than 75 mol %. natural gas, in particular from 80 mol %. to 99 mol %. natural gas, especially from 94 mol %. to 95 mol %. natural gas.

Advantageously, the permeate of the second processing level E2 comprising $CO_2$ can be reinjected into a petroleum deposit. Likewise, after possible processings, the retentate of the first processing level E1 comprising natural gas may be marketed.

Furthermore, the method according to the permeate mode may further comprise increasing the pressure of the permeate collected via the permeate outlet SP of the membrane module M of the first processing level E1 in the permeate transfer line LTP.

In addition, or alternatively, the method according to the retentate mode could further comprise increasing the permeate pressure collected via the permeate outlet SP of the membrane module M of the first processing level E1 in the permeate collection line LCP.

3. Method: Reassignment of a Membrane Module

According to a first aspect, all of the membrane modules M for the first and second processing levels E1, E2 are shared.

Thus, when the evolution in the operating conditions leads to one of the processing levels requiring less membrane surface for gas processing and the other processing level requiring more membrane surface for gas processing, then the method comprises a reassignment step of at least one membrane module M assigned from the level requiring less membrane surface to the level requiring more membrane surface.

The membrane surface of each of the processing levels depends on the number of membrane modules M assigned to each level. The number of membrane modules M to be reassigned from one level to another may depend on the $CO_2$ content in the natural gas, mainly increase of this content, but may also depend on the decrease or variation thereof.

The number of membrane modules M of the level requiring less membrane surface to be reassigned to the level requiring more membrane surface may also depend on the evolution in the natural gas pressure.

Typically, only one or more membrane modules M of the level requiring less membrane surface can be reassigned to the level requiring more membrane surface.

Advantageously, the reassigning step in the method according to the present invention allows modulating the membrane surface required by each processing level and thus optimizing the total membrane surface in the installation I. Thus, in comparison with to the methods in the prior art, the total installed membrane surface can be decreased. In addition, the reassigning step in the method allows optimizing the power consumed when performing the method (see the examples).

Furthermore, the reassignment of membrane modules M according to the needs is not necessarily carried out in a continuous manner, but is preferably carried out in steps, wherein the steps correspond for example to the following intervals of $CO_2$ content (in mol %.) in the gas to be processed: ]10; 20];]20; 30];]30; 40];]40; 50];]50; 60];]60; 70]; and]70; 80]. Different steps may be contemplated, for example instead of the]30; 40];]40; 50] and]50; 60] steps, it is possible to use the]30; 44];]44; 60] steps instead (1 fewer step).

In addition, the change in the number of membrane modules in steps induces a membrane surface excess for the first processing level and/or the second processing level.

This can result in a gas to be reinjected having a $CO_2$ content higher than the required specifications which are generally 95 mol %. In order to reach the specification value, a bypass for bypassing the second processing level in permeate mode or the first processing level in retentate mode can be provided (bypass). This bypass collects a part of the gas reaching the inlet of the second processing level E2 in permeate mode or of the first processing level E1 in retentate mode to direct it directly to the permeate collection line LCP.

This can also result in a gas collected at the end of the processing having a $CO_2$ content below the specifications which are generally 5 mol %. In order to reach the specification value, a bypass for bypassing the first processing level in permeate mode or the second processing level in retentate mode may be provided. This bypass collects part of the gas reaching the inlet of the first processing level E1 in permeate mode or of the second processing level E2 in retentate mode to direct it directly to the retentate collection line LCR.

The different features according to the operating mode are described below.

3.1 Operation in Retentate Mode

Typically, the reassignment step in the method according to the invention can be implemented when the $CO_2$ content in the natural gas reaches a threshold value $T_{CO2}^{threshold}$. The threshold value $T_{CO2}^{threshold}$ depends on various parameters such as the $CO_2$ pressure, the $CO_2$ content, the specifications, the membrane system, the membranes performances, etc. Typically, the threshold value $T_{CO2}^{threshold}$ ranges from 10 mol %. to 75 mol %, preferentially from 20 mol %. to 60 mol %, more preferentially from 30 mol %. to 50 mol %.

The method may comprise increasing the pressure of the permeate being recirculated, in particular via the recycling compressor CompTR, i.e. the pressure of the permeate collected at the permeate outlet SP of the second processing level E2, in which case the method may further comprise injecting the compressed permeate, in particular via the recycling compressor CompTR, through the inlet of the first processing level E1.

The method may further comprise increasing the pressure of the permeate collected at the permeate outlet SP of the first processing level E1. This permeate which is compressed, in particular via the reinjection compressor CompTP, and which comprises $CO_2$ can then be injected into a petroleum deposit.

Typically, the increase in permeate pressure can be achieved by decreasing the rotational speed of the recycling compressor CompTR or by changing the orientation of the blades of the recycling compressor CompTR.

Typically, the increase in permeate pressure can be achieved by decreasing the rotational speed of the reinjection compressor CompTP or by changing the orientation of the blades of the reinjection compressor CompTP.

The permeate pressure at the permeate outlet SP of the membrane module M of the first processing level E1 can range from 0.1 bar to 10 bar, preferentially from 1 bar to 7 bar, more preferentially from 1.5 bar to 5 bar.

The permeate pressure at the permeate outlet SP of the membrane module M of the second processing level E2 can range from 0.1 bar to 10 bar, preferentially from 1 bar to 7 bar, more preferentially from 1.5 bar to 5 bar.

The pressure at the inlet EM of the membrane module M of the first processing level E1 or the membrane module M of the second processing level E2 can range from 20 bar to 120 bar, preferentially from 40 bar to 100 bar, more preferentially from 60 bar to 90 bar.

In this retentate mode, the most advantageous reassignment direction is from the second processing level E2 to the first processing level E1 and will be described first. Nevertheless, the reverse reassignment direction is also possible.

3.1.1. Reassignment from the Second Processing Level to the First Processing Level Typically, when the evolution in the operating conditions results in the need for membrane surface required for the first processing level E1 to increase and in the need for the membrane surface required for the second processing level E2 to decrease, the reassignment step from the second processing level E2 to the first processing level E1 comprises the following steps:
  fluidly disconnecting the inlet EM, the retentate outlet SR and the permeate outlet SP of the membrane module(s) M to be reassigned;
  fluidly connecting the inlet EM of the membrane module(s) M to be reassigned to the power supply line LA;
  fluidly connecting the permeate outlet SP of the membrane module(s) M to be reassigned to the permeate collection line LCP, and
  fluidly connecting the retentate outlet SR of the membrane module or modules M to be reassigned to the retentate transfer line LTR.

Typically, the step of reassigning one or more membrane modules M from the second processing level E2 to the first processing level E1 can be implemented very simply as follows.

Fluidly disconnecting each membrane module M to be reassigned can be achieved by closing the open valves establishing the fluidic connection:
  between the inlet EM of each membrane module M to be reassigned and the transfer inlet line LET,
  between the retentate outlet SR of each membrane module M to be reassigned and the retentate collection line LCR, and
  between the permeate outlet SP of each membrane module M to be reassigned and the permeate transfer line LTP.

These open valves then become closed valves and each membrane module M to be reassigned is isolated from the second processing level E2.

Fluidly connecting each membrane module M to be reassigned can be achieved by opening the closed valves establishing the fluidic connection:
  between the inlet EM of each membrane module M to be reassigned and the supply line LA,
  between the retentate outlet SR of each membrane module M to be reassigned and the retentate transfer line LTR, and
  between the permeate outlet SP of each membrane module M to be reassigned and the permeate collection line LCP.

These three closed valves then become open valves and the modules are then reassigned to the first processing level E1.

3.1.2. Reassignment from the First Processing Level to the Second Processing Level Typically, when the evolution in the operating conditions results in membrane surface required for the second processing level E2 to increase and the membrane surface required for the first processing level E1 to decrease, the reassignment step from the first processing level E1 to the second processing level E2 comprises the following steps:
  fluidly disconnecting the inlet EM, the retentate outlet SR and the permeate outlet SP of the membrane module or modules M to be reassigned;
  fluidly connecting the inlet EM of the membrane module(s) M to be reassigned to the transfer inlet line LET;
  fluidly connecting the permeate outlet SP of the membrane module(s) M to be reassigned to the permeate transfer line LTP, and
  fluidly connecting the retentate outlet SR of the membrane module or modules M to be reassigned to the retentate collection line LCR.

Typically, the step of reassigning one or more membrane module(s) M from the first processing level E1 to the second processing level E2 can be implemented very easily, especially by means of the valve system SV, as follows.

Fluidly disconnecting each membrane module M to be reassigned can be achieved by closing the open valves establishing the fluidic connection:
  between the inlet EM of each membrane module M to be reassigned and the supply line LA,
  between the retentate outlet SR of each membrane module M to be reassigned and the retentate transfer line LTR, and
  between the permeate outlet SP of each membrane module M to be reassigned and the permeate collection line LCP.

These open valves then become closed valves and each membrane module M to be reassigned is isolated from the first processing level E1.

Fluidly connecting each membrane module M to be reassigned can be achieved by opening the closed valves establishing the fluidic connection:

- between the inlet EM of each membrane module M to be reassigned and the transfer inlet line LET,
- between the retentate outlet SR of each membrane module to be reassigned M and the retentate collection line LCR, and
- between the permeate outlet SP of each membrane module to be reassigned M and the permeate transfer line LTP.

These three closed valves then become open valves and the modules are then reassigned to the second processing level E2.

3.2. Operation in the Permeate Mode

Figure 4A:
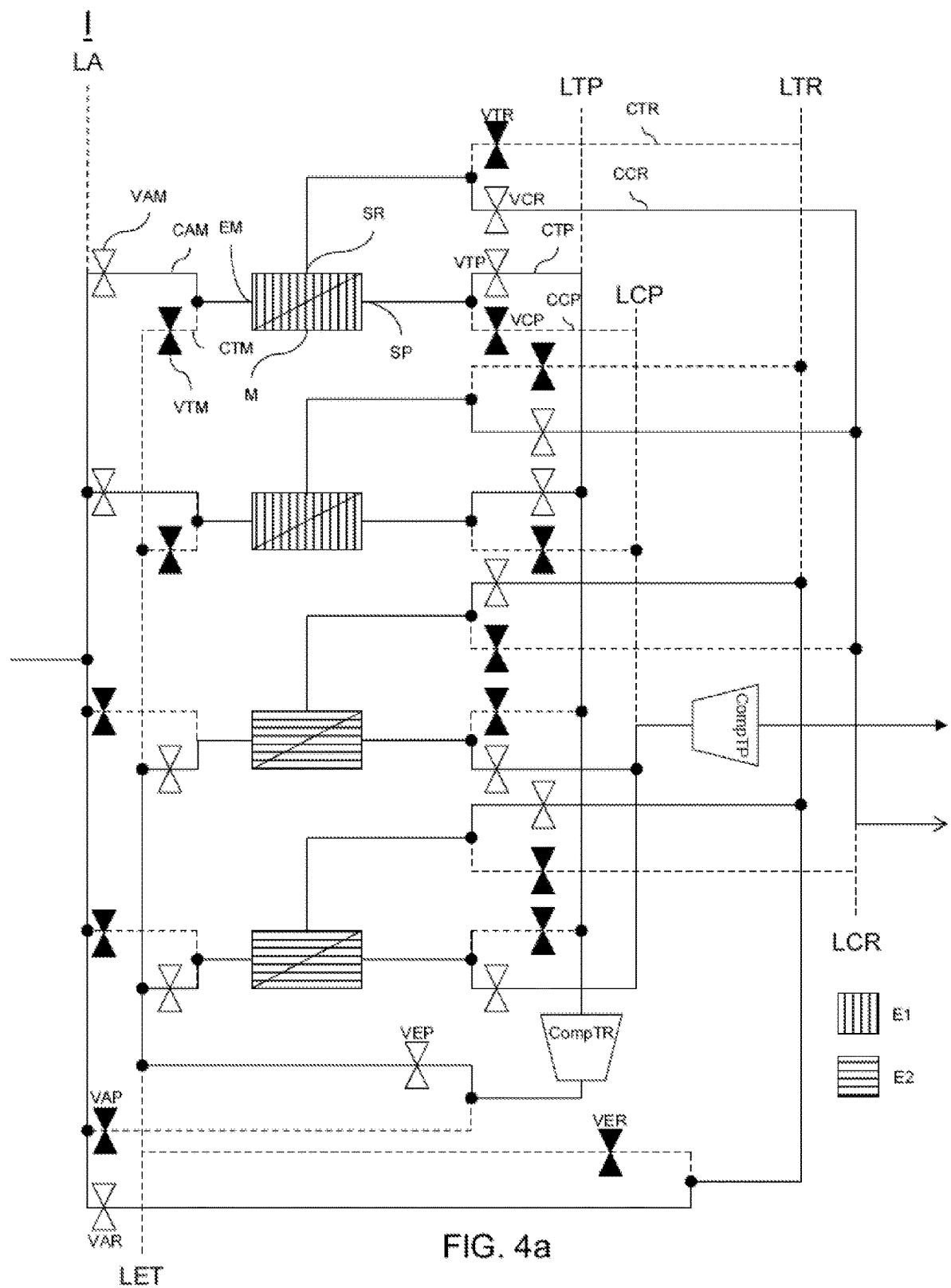
FIGS. 4a, 4b and 4c schematically represent an installation for carrying out the method according to the present invention, according to certain embodiments, in which the first processing level and the second processing level are fluidly connected in permeate mode, and in which a membrane module of the first processing level is reassigned to the second processing level.
Figure 4B:
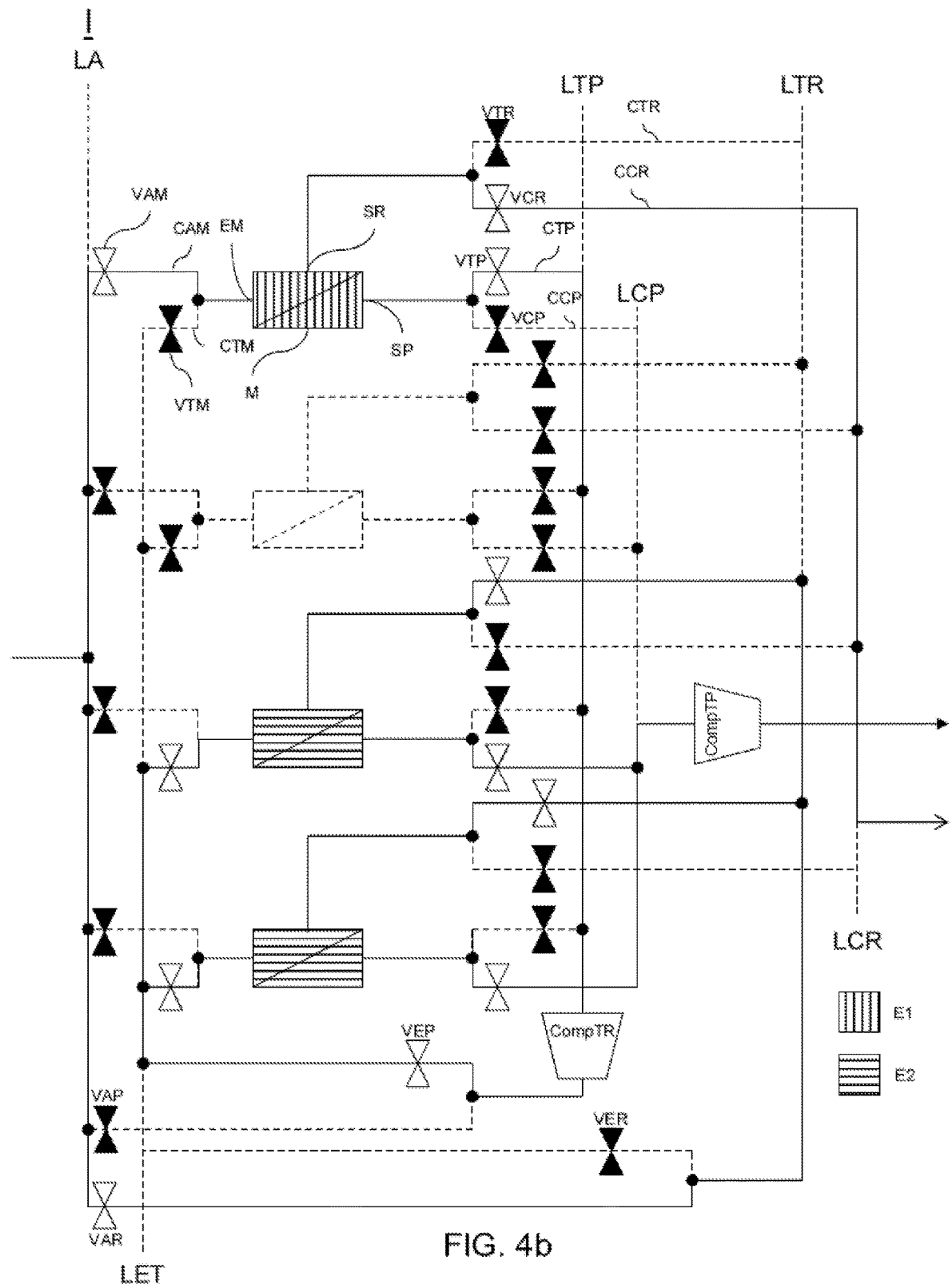
Figure 4C:
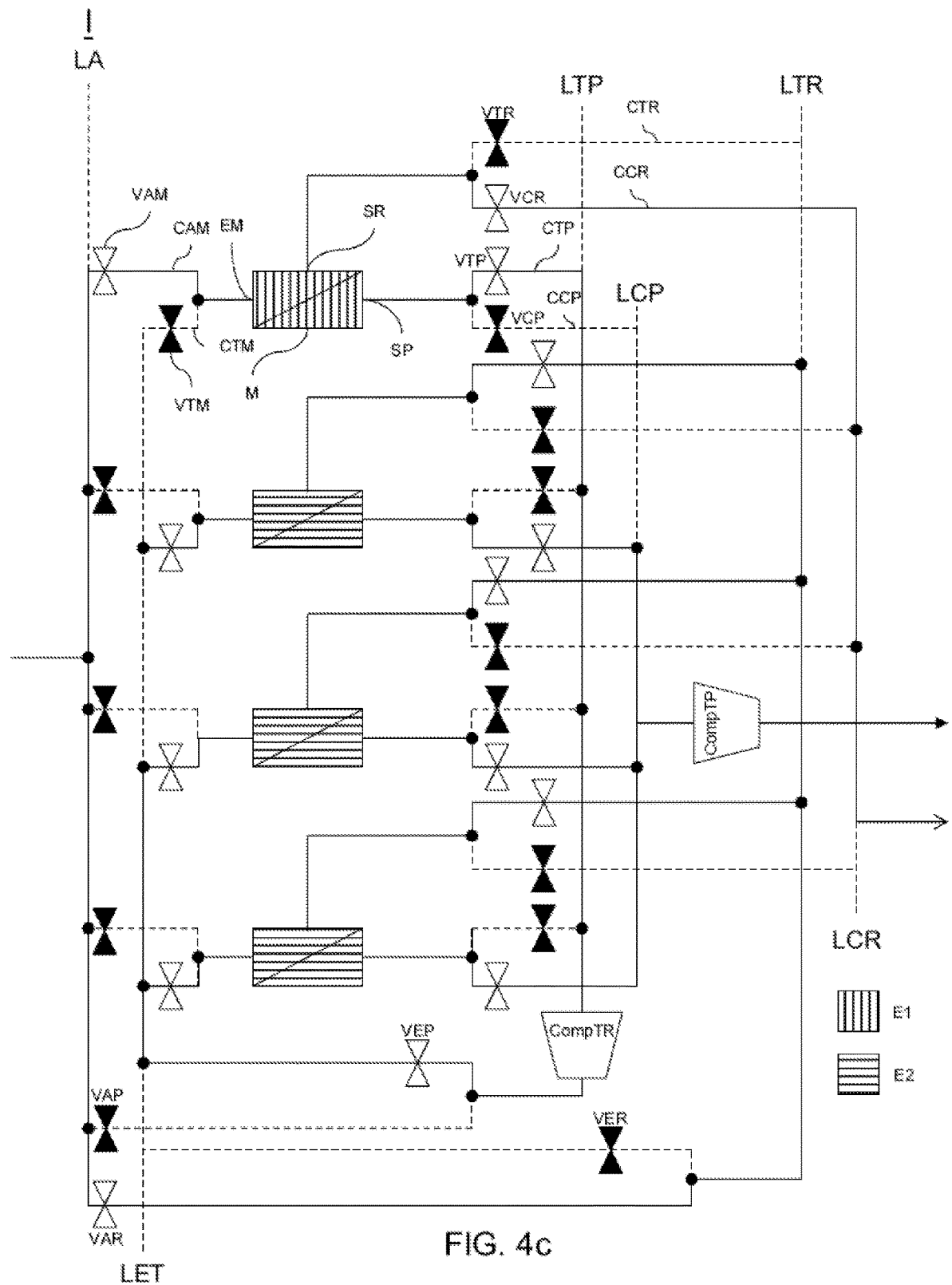

According to this particular embodiment, illustrated by FIGS. 4a, 4b and 4c, the first processing level E1 and the second processing level E2 are fluidly connected in permeate mode.

Typically, the reassignment step of the process according to the invention can be implemented when the $CO_2$ content in the natural gas reaches a threshold value, $T_{CO_2}^{seuil}$. The threshold value $T_{CO_2}^{seuil}$ depends on various parameters such as the $CO_2$ pressure, the $CO_2$ content, the specifications, the membrane system, the membranes performance, etc. Typically, the threshold value $T_{CO_2}^{seuil}$ is worth from 10 mol %. to 75 mol %, in particular from 20 mol %. to 60 mol %, especially from 30 mol %. to 50 mol %.

The method may comprise increasing the pressure of the permeate collected at the permeate outlet SP of the first processing level E1, in particular via the recycling compressor CompTR, in which case the method may also comprise the injection of the compressed permeate via the recycling compressor CompTR through the inlet of the second processing level E2.

The method may furthermore comprise increasing the pressure of the permeate collected at the permeate outlet SP of the second processing level E2, in particular via the reinjection compressor CompTP. This permeate compressed via the reinjection compressor CompTP and containing $CO_2$, can then be injected into a petroleum deposit.

Typically, the increase in permeate pressure can be achieved by decreasing the rotational speed of the recycling compressor CompTR or by changing the orientation of the blades of the recycling compressor CompTR.

Typically, the increase in permeate pressure can be achieved by decreasing the rotational speed of the reinjection compressor CompTP or by changing the orientation of the blades of the reinjection compressor CompTP.

The permeate pressure at the permeate outlet SP of the membrane module M of the first processing level E1 can range from 0.1 bar to 10 bar, preferentially from 1 bar to 7 bar, more preferentially from 1.5 bar to 5 bar.

The permeate pressure at the permeate outlet SP of the membrane module M of the second processing level E2 can range from 0.1 bar to 10 bar, preferentially from 1 bar to 7 bar, more preferentially from 1.5 bar to 5 bar.

The pressure at the inlet EM of the membrane module M of the first processing level E1 or of the membrane module M of the second processing level can range from 20 bar to 120 bar, preferentially from 40 bar to 100 bar, more preferentially from 60 bar to 90 bar.

In this permeate mode, the most advantageous reassignment direction is from the first processing level E1 to the second processing level E2 and will be described first. Nevertheless, the reassignment direction from the second to the first processing level is also a valid option.

3.2.1. Reassignment from the First Processing Level to the Second Processing Level Typically, when the evolution in the operating conditions results in the membrane surface required for the second processing level E2 to increase and the membrane surface required for the first processing level E1 to decrease, the reassignment step from the first processing level E1 to the second processing level E2 comprises the following steps:

- fluidly disconnecting the inlet EM, the retentate outlet SR and the permeate outlet SP of the membrane module(s) M to be reassigned;
- fluidly connecting the inlet EM of the membrane module(s) M to be reassigned to the transfer inlet line LET;
- fluidly connecting the retentate outlet SR of the membrane module(s) M to be reassigned to the retentate transfer line LTR, and
- fluidly connecting the permeate outlet SP of the membrane module(s) M to be reassigned to the permeate collection line LCP.

Typically, the step of reassigning from the first processing level E1 to the second processing level E2 can be carried out very simply by means of the valve system SV as follows.

Fluidly disconnecting each membrane module M to be reassigned can thus be carried out by closing the open valves establishing the fluidic connection:

- between the inlet EM of each membrane module M to be reassigned and the supply line LA,
- between the retentate outlet SR of each membrane module M to be reassigned and the LCR retentate collection line, and
- between the permeate outlet SP of each membrane module M to be reassigned and the permeate transfer line LTP.

These open valves then become closed valves and each fluidly disconnected membrane module M to be reassigned is isolated from the first processing level E1.

Fluidly connecting each membrane module M to be reassigned can be realized by opening the closed valves establishing the fluidic connection:

- between the inlet EM of each membrane module M to be reassigned and the transfer inlet line LET,
- between the retentate outlet SR of each membrane module M to be reassigned and the retentate transfer line LTR, and
- between the permeate outlet SP of each membrane module M to be reassigned and the permeate collection line LCP.

These three closed valves then become open valves and the modules are then reassigned to the second processing level E2.

3.2.2. Reassignment from the Second Processing Level to the First Processing Level Typically, when the membrane surface required for the first processing level E1 increases and the membrane surface required for the second processing level E2 decreases, the reassignment step from the second processing level E2 to the first processing level E1 comprises the following steps:

- fluidly disconnecting the inlet EM, the retentate outlet SR and the permeate outlet SP of the membrane module or modules M to be reassigned;
- fluidly connecting the inlet EM of the membrane module(s) M to be reassigned to the power supply line LA;
- fluidly connecting the permeate outlet SP of the membrane module(s) M to be reassigned to the permeate transfer line LTP, and fluidly connecting the retentate outlet SR of the membrane module or modules M to be reassigned to the retentate collection line LCR.

Typically, the step of reassigning one or more membrane modules M from the second processing level E2 to the first processing level E1 can be carried out very simply as follows.

Fluidly disconnecting each membrane module M to be reassigned can be achieved by closing the open valves establishing the fluidic connection:
- between the inlet EM of each membrane module M to be reassigned and the transfer inlet line LET,
- between the retentate outlet SR of each membrane module M to be reassigned and the retentate transfer line LTR, and
- between the permeate outlet SP of each membrane module M to be reassigned and the permeate collection line LCP.

These open valves then become closed valves and each membrane module M to be reassigned is isolated from the second processing level E2.

Fluidly connecting each membrane module M to be reassigned can be carried out by opening the closed valves establishing the fluidic connection:
- between the inlet EM of each membrane module M to be reassigned and the supply line LA,
- between the retentate outlet SR of each membrane module M to be reassigned and the retentate collection line LCR, and
- between the permeate outlet SP of each membrane module M to be reassigned and the permeate transfer line LTP.

These three closed valves then become open valves and the modules are then reassigned to the first processing level E1.

4. Method: Switching from One Operating Mode to Another

According to a first aspect, the processing of natural gas is carried out either in the retentate mode (FIGS. 1a and 3a to 3c), or in the permeate mode (FIGS. 1b and 4a to 4c) as described above.

In a first variation, natural gas processing is first carried out according to the retentate mode. Then, when the content of $CO_2$ present in the natural gas reaches a given value, natural gas processing is carried out according to the permeate mode.

In a second variation, natural gas processing is carried out according to the permeate mode. Then, when the content of $CO_2$ present in the natural gas reaches a given value, natural gas processing is carried out according to the retentate mode.

Thus, the method according to the second aspect of the invention comprises a step of switching from one operating mode to another.

Advantageously, this method makes it possible to benefit from the advantages of the two operating modes based on the $CO_2$ content evolution in the natural gas to be processed. Indeed, when the $CO_2$ content in the gas to be processed is less than $T_{CO_2}^{trig}$, the permeate mode is more advantageous in terms of membrane surface and consumed power. When the $CO_2$ content is greater than $T_{CO_2}^{trig}$ then the retentate mode becomes more economical in terms of membrane surface while the consumed power stabilizes. In addition, by combining the two operating modes, the total membrane surface to be installed is lower than using either of the two operating modes alone and the total consumed power is stabilized.

The given value, $T_{CO_2}^{trig}$, of the content of $CO_2$ present in the natural gas, triggering the gas processing according to the retentate mode or the permeate mode depends on various parameters such as the $CO_2$ pressure, the $CO_2$ content, the specifications, the membrane system, membranes performances, and so on.

Typically, $T_{CO_2}^{trig}$ can range from 20 mol %. to 80 mol %, preferentially from 30 mol %. to 70 mol %, more preferentially from 40 mol %. to 60 mol %.

4.1. Switching from the Retentate Mode to the Permeate Mode

The switch from the retentate mode (FIG. 3a) to the permeate mode (FIG. 4a) is carried out as follows:
- fluidly disconnecting the inlet EM, the permeate outlet SP and the retentate outlet SR of the membrane modules M which are connected as described above (1.1); and
- fluidly connecting the inlet EM, the permeate outlet SP and the retentate outlet SR of at least a part of the membrane modules M so that:
  in the first and second processing levels E1, E2, the membrane modules M are connected as described above (1.2).

Typically, the step of switching from permeate mode to retentate mode can be carried out very easily by means of the valve system SV described above in connection with the method according to the first aspect of the invention.

The fluidic disconnections for each membrane module M can thus be performed by closing the open valves establishing the fluidic connection:
- between the inlet EM of each membrane module M and the supply line LA or the transfer inlet line LET,
- between the retentate outlet SR of each membrane module M and the retentate collection line LCR or the retentate transfer line LTR, and
- between the permeate outlet SP of each membrane module M and the permeate collection line LCP or the permeate transfer line LTP.

These open valves then become closed valves and each fluidly disconnected membrane module M is isolated.

The fluidic connections of each membrane module M can thus be performed by opening the closed valves that establish the fluidic connection between:
- in the first processing level E1:
  - the inlet EM of each membrane module M and the feed inlet line LA,
  - the retentate outlet SR of each membrane module M and the retentate collection line LCR,
  - the permeate outlet SP of each membrane module M and the permeate transfer line LTP,
- in the second processing level E2:
  - the inlet EM of each membrane module M and the transfer inlet line LET,
  - the retentate outlet SR of each membrane module M and the retentate transfer line LTR,
  - the permeate outlet SP of each membrane module M and the permeate collection line LCP.

These closed valves then become open valves.

The other membrane modules M that are not reconnected then remain isolated.

Alternatively, switching from the retentate mode to the permeate mode can be achieved by:
- disconnecting the inlet EM of at least part of the membrane modules M of the first processing level E1 from the supply line LA and connecting them to the transfer inlet line LET, thus assigning them to the second processing level E2 of the permeate mode, the other part, if any, of the membrane modules M of the first processing level E1 being isolated;

disconnecting the inlet EM of at least part of the membrane modules M of the second processing level E2 from the transfer inlet line LET and connecting them to the supply line LA, thus assigning them to the first processing level E1 of the permeate mode, the other part, if any, of the membrane modules M of the second processing level E2 being isolated.

Alternatively, switching from retentate mode to permeate mode can be achieved by:

disconnecting the retentate outlet SR and the permeate outlet SP of at least part of the membrane modules M of the first processing level E1 respectively from the retentate transfer line LTR and from the permeate collection line LCP and connecting them respectively to the retentate collection line LCR and to the permeate transfer line LTP, thereby assigning them to the first processing level E1 of the permeate mode, the other part, if any, of the membrane modules M of the first processing level E1 being isolated;

disconnecting the retentate outlet SR and the permeate outlet SP of at least a part of the membrane modules M of the second processing level E2 respectively from the retentate collection line LCR and from the permeate transfer line LTP and connecting them respectively to the retentate transfer line LTR and to the permeate collection line LCP, thereby assigning them to the second processing level E2 of the permeate mode, the other part, if any, of the membrane modules M of the second processing level E2 being isolated.

Thus, in these two alternatives, membrane modules M reused after switching to permeate mode are never fully isolated, thereby allowing savings in operation of closing and opening valves.

Typically, the $CO_2$ content in the natural gas may require a required total membrane surface $S_r$, the membrane modules M providing a total available surface, when the available total membrane surface exceeds the required total surface for separating $CO_2$, then the permeate pressure can be increased in any of the levels of the installation I. This pressure increase can be carried out by recycling compressors CompTR or reinjection compressors CompTP.$$

4.2. Switching from the Permeate Mode to the Retentate Mode

The switch from the permeate mode to the retentate mode is carried out as follows:

fluidly disconnecting the inlet EM, the permeate outlet SP and the retentate outlet SR of the membrane modules M which are connected as described above (1.2); and fluidly connecting the inlet EM, the permeate outlet SP and the retentate outlet SR of at least a part of the membrane modules M so that:

in the first and second processing levels E1, E2, the membrane modules M are connected as described above (1.1).

Typically, the switching step from the permeate mode to the retentate mode can be carried out very simply by means of the valve system SV described above in connection with the method according to the first aspect of the invention.

The fluidic disconnections of each membrane module M can thus be realized by closing the open valves establishing the fluidic connection:

between the inlet EM of each membrane module M and the supply line LA or the transfer inlet line LET, between the retentate outlet SR of each membrane module M and the retentate collection line LCR or the retentate transfer line LTR, and between the permeate outlet SP of each membrane module M and the permeate collection line LCP or the permeate transfer line LTP.

These open valves then become closed valves and each fluidly disconnected membrane module M is isolated.

The fluidic connections of each membrane module M can thus be achieved by opening the closed valves establishing the fluidic connection between:

in the first processing level E1:
the inlet EM of each membrane module M and the feed inlet line LA,
the retentate outlet SR of each membrane module M and the retentate transfer line LTR,
the permeate outlet SP of each membrane module M and the permeate collection line LCP, in the second processing level E2:
the inlet EM of each membrane module M and the transfer inlet line LET,
the retentate outlet SR of each membrane module M and the retentate collection line LCR,
the permeate outlet SP of each membrane module M and the permeate transfer line LTP.

These closed valves then become open valves.

The other membrane modules M that are not reconnected then remain isolated.

Alternatively, switching from permeate mode to retentate mode can be achieved by:

disconnecting the inlet EM of at least part of the membrane modules M of the first processing level E1 from the supply line LA and connecting them to the transfer inlet line LET, thus assigning them to the second processing level E2 of the retentate mode, the other part, if any, of the membrane modules M of the first processing level E1 being isolated;

disconnecting the inlet EM of at least a part of the membrane modules M of the second processing level E2 from the transfer inlet line LET and connecting them to the supply line LA, thus assigning them to the first processing level E1 of the retentate mode, the other part, if any, of the membrane modules M of the second processing level E2 being isolated.

Alternatively, switching from permeate mode to retentate mode can be achieved by:

disconnecting the retentate outlet SR and the permeate outlet SP from at least part of the membrane modules M of the first processing level E1 respectively of the retentate collecting line LCR and the permeate transfer line LTP and connecting them respectively to the retentate transfer line LTR and to the permeate collection line LCP, thereby assigning them to the first processing level E1 of the permeate mode, the other part, if any, of the membrane modules M of the first processing level E1 being isolated;

disconnecting the retentate outlet SR and the permeate outlet SP from at least part of the membrane modules M of the second processing level E2 respectively of the retentate transfer line LTR and the permeate collection line LCP and connecting them respectively to the retentate collection line LCR and to the permeate transfer line LTP, thereby assigning them to the second processing level E2 of the retentate mode, the other part, if any, of the membrane modules M of the second processing level E2 being isolated.

Thus, in these two alternatives, membrane modules M reused after switching to retentate mode are never fully isolated, thereby allowing savings in closing operation and opening valves.

Typically, the $CO_2$ content in the natural gas may require a required total membrane surface $S_r$, the membrane modules EM providing a total available surface, when the total available membrane surface exceeds the required total surface for separating $CO_2$, then the permeate pressure can be increased on any of the installation levels. This pressure increase can be achieved by recycling compressors CompTR or reinjection compressors CompTP.

5. Process Combining the Method According to the First Aspect of the Invention and the Method According to the Second Aspect of the Invention.

The method according to the first aspect of the invention and the method according to the second aspect of the invention can be combined, that is to say that during operation according to one or other of the operating modes, membrane modules M can be reassigned from one of the processing levels to another. The person skilled in the art will be able to carry out all embodiments by combining the different steps described above.

EXAMPLES

In the following examples, the characteristics and the initial composition of the natural gas to be processed are presented in Table 5 below. Natural gas initially contains about 10 mol %. of $CO_2$, then the $CO_2$ content of the natural gas is increased up to 80 mol %. by injecting $CO_2$ into the deposit.

TABLE 5

Characteristics and Initial Composition of the Natural Gas

| Gas characteristics | |
|---|---|
| Pressure (bar] | 30 |
| Temperature (° C.) | 50 |
| Flow (MMSCFD) | 460 |
| Composition (mol %.) | |
| $N_2$ | 1.22 |
| $CO_2$ | 10.03 |
| $H_2S$ (ppm) | 543 |
| $H_2O$ (ppm) | 50 |
| $C_1$ | 72.45 |
| $C_2$ | 8.94 |
| $C_3$ | 4.43 |
| $C_{4+}$ | 2.93 |

MMSCFD means "million standard cubic feet per day" and is worth 1177.17 $Sm^3/h$ at 15° C. (59° F.).
$C_n$ designating hydrocarbons with n carbon(s), 4+ referring to hydrocarbons with 4 or more carbons.

Example 1: Method Only Implementing the Retentate Mode

Figure 7:
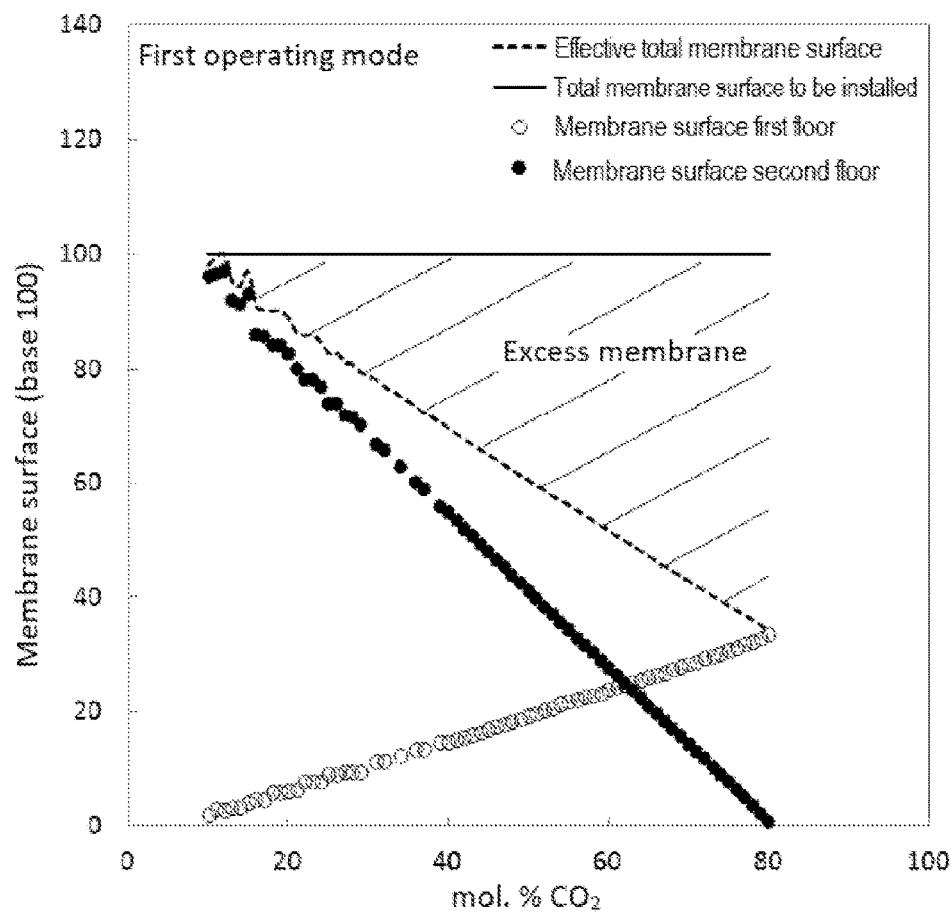
FIG. 7 is a graph showing the evolution of required membrane surfaces in a prior art process in which the first processing level and the second processing level are fluidly connected in retentate mode.

FIG. 7 shows the evolution in the required membrane surfaces (in base 100, 100 being the required total membrane surface to be installed at the start of the processing, for a gas containing approximately 10 mol %. of $CO_2$) for the first processing level E1, the second processing level E2 and the total effective membrane surface as a function of the $CO_2$ content in the gas to be processed for the retentate mode.

It can be seen that the required membrane surface of the first processing level E1 increases from 2 to 34, thus allowing a better separation of the gases at this level, thereby reducing the membrane surface for the second processing level E2, which decreases from 98 to almost 0. The total membrane surface therefore decreases as the $CO_2$ content increases in the gas to be processed.

The membrane unit is made up with membrane modules having a given surface. Arbitrarily, it is assumed that a membrane module has a surface of 1 in base 100.

In the case where there is neither reassignment of membrane modules nor switching from retentate mode to permeate mode, the total number of membrane modules to be installed is 98 for the second processing level and 34 for the first processing level, which amounts in a total number of 132 membrane modules to be installed.

The benefits of the method comprising steps of reassigning membrane modules in the case of retentate mode is easy to understand. Referring again to FIG. 7, it can be observed that the total effective membrane surface throughout the field life never exceeds the starting value (when the gas to be processed contains around 10 mol %. of $CO_2$). It is thus possible to reuse part of the membrane modules initially assigned to the second processing level, which however become useless to this processing level, so as to reassign them to the first processing level, which needs more and more membrane modules.

Thus, only 100 membrane modules must be installed; it can be observed that the reassignment of membrane modules allows the saving of 32 membrane modules compared to the process without reassigning membrane modules from one level to another.

Figure 8:
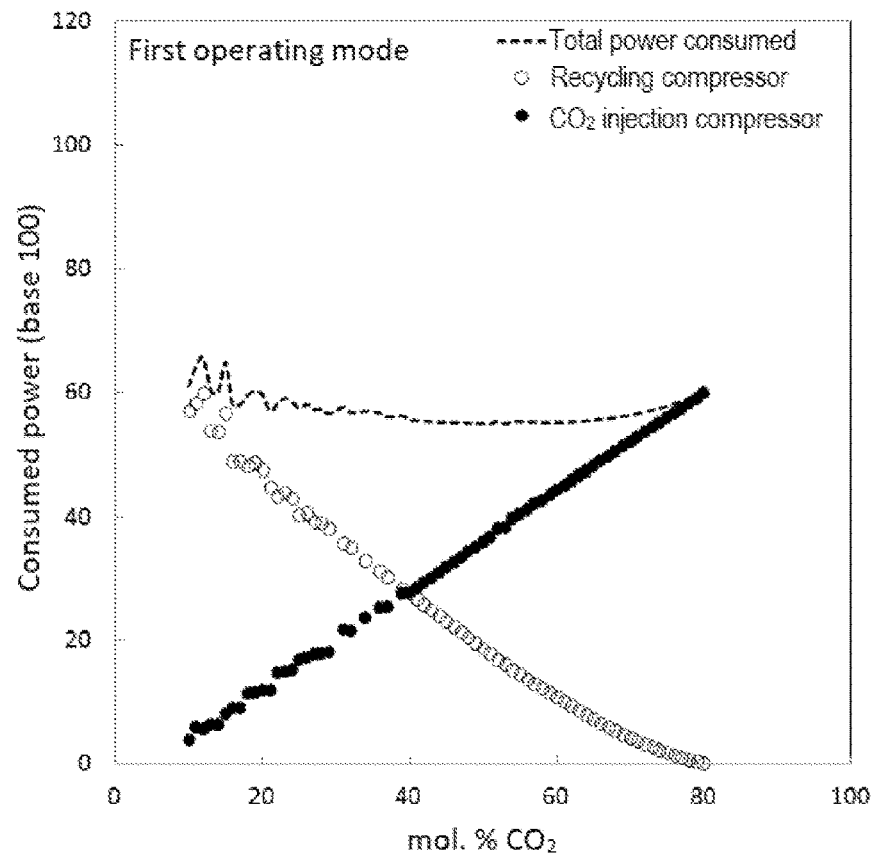
FIG. 8 is a graph showing the evolution of the power consumed by a prior art process in which the first processing level and the second processing level are fluidly connected in retentate mode.

FIG. 8 shows the evolution in the total consumed power (in base 100, 100 being the maximum total consumed power in the permeate mode at the end of the oil deposit life) by the recycling compressor in the membrane process but also for the reinjection compressor for the reinjection of $CO_2$ into the deposit.

The power consumed by the reinjection compressor increases because the extracted $CO_2$ flow rate increases. On the other hand, the flow to be recycled at the second processing level decreases because the quantity of hydrocarbon in the field decreases and the separation of gases in the first processing level is increasingly efficient, explaining a decrease in the power consumed by the recycling compressor. The total consumed power remains generally stable throughout the field life.

Example 2: Method Only Implementing the Permeate Mode

Figure 9:
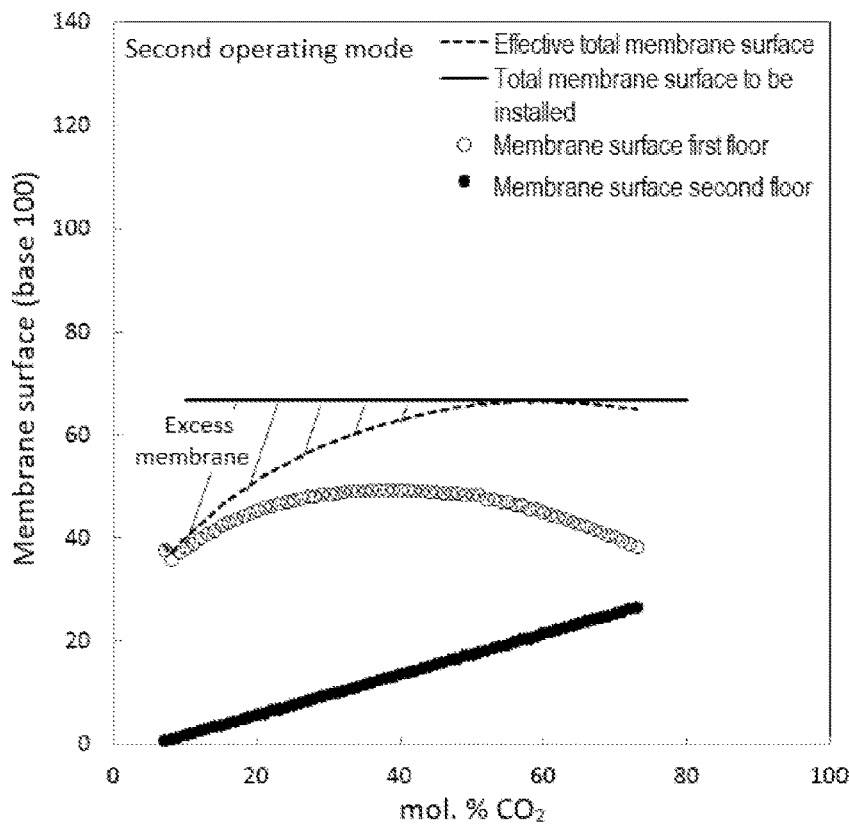
FIG. 9 is a graph showing the evolution in required membrane surfaces in a prior art process in which the first processing level and the second processing level are fluidly connected in permeate mode.

FIG. 9 shows the evolution in the required membrane surfaces (in base 100, which is the same base as in Example 1) for the first processing level E1, the second processing level E2 and in the total effective membrane surface and the membrane surface to be installed according to the $CO_2$ content in the gas to be processed for the permeate mode.

The membrane surface of the first processing level increases (with a maximum at about 30% with respect to the initial value) and then decreases with the increase in $CO_2$ content in the gas to be processed. The minimum required membrane surface is 37 and the maximum required membrane surface is 49 for the first processing level (base 100, i.e. the same base as that of Example 1).

The membrane surface of the second processing level increases, for its part, continuously because the amount of $CO_2$ to be removed increases over time from 1 to 28 (in base 100).

Thus, the total membrane surface to be installed if there is no reassignment of membrane modules from one processing level to another is 77 (base 100).

The membrane surface to be installed for this process is lower than that in Example 1.

Referring again to FIG. 9, it can be observed that the total effective membrane surface throughout the field life never exceeds 67 (base 100). It is thus possible to reuse part of the membrane modules which are initially assigned to the first processing level but become unnecessary to this processing level, so as to reassign them to the second processing level which needs more and more membrane modules.

Thus, it can be observed that the reassignment of membrane modules allows saving 10 membrane modules (it is always assumed that a membrane module has a surface of 1 in base 100).

Figure 10:
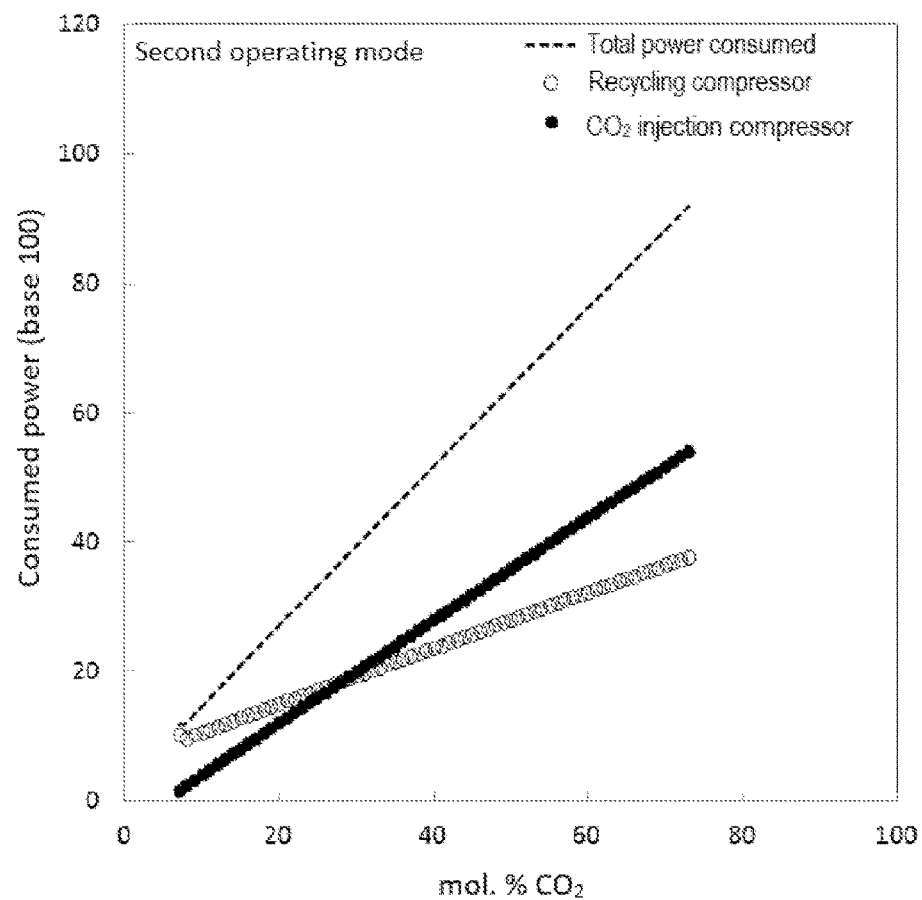
FIG. 10 is a graph showing the evolution in power consumed by a prior art process in which the first processing level and the second processing level are fluidly connected in permeate mode.

The energy consumed is increasing over time as shown in FIG. 10 showing the evolution of the total power consumed by the recycling compressor in the membrane process but also for the reinjection compressor for reinjecting the $CO_2$ into the field.

The power consumed significantly increases throughout the field life. It is initially lower than the power consumed in Example 1 and then becomes greater when the $CO_2$ contained in the gas to be processed exceeds about 44 mol %.

Example 3: Method Comprising Reassignment Steps for Reassigning Membrane Modules and a Switching Step for Switching from Permeate Mode to Retentate Mode As shown in Table 6 below, the installation I implementing the method comprises 66 membrane modules M (in base 100, which is the same base as in Example 1).

TABLE 6

Assignment Evolution in the membrane modules M and operating mode of the installation I depending on the $CO_2$ content in the natural gas to be processed.

| $CO_2$ content in the natural gas to be processed (mol %.) | Number of membrane modules for the $1^{st}$ level | Number of membrane modules for the $2^{nd}$ level | Number of modules to isolate | Operating mode |
| --- | --- | --- | --- | --- |
| 10 < x ≤ 20 | 46 | 6 | 14 | Permeate mode |
| 20 < x ≤ 30 | 49 | 10 | 7 | |
| 30 < x ≤ 44 | 50 | 16 | 0 | |
| 44 < x ≤ 60 | 17 | 49 | 0 | Retentate mode |
| 60 < x ≤ 70 | 24 | 28 | 14 | |
| 70 < x ≤ 80 | 29 | 15 | 22 | |

Between 10 mol %. and 20 mol %. of $CO_2$ in the natural gas to be processed, the installation I operates according to the permeate mode, 46 membrane modules M are assigned to the first processing level E1, 6 membrane modules M are assigned to the second processing level E2 and 14 membrane modules M are isolated, i.e. they are not fluidly connected.

When the $CO_2$ content exceeds 20 mol %, 3 isolated membrane modules M are reassigned to the first processing level E1 and 4 isolated membrane modules M are reassigned to the second processing level E2.

Above 30 mol %, an isolated membrane module M is reassigned to the first processing level E1 and 6 isolated membrane modules M are reassigned to the second processing level E2, all of the membrane modules M are then used.

When the content of $CO_2$ in the gas to be processed reaches 44 mol %, then a switching step for switching from the permeate mode (50 membrane modules M in the first processing level E1 and 16 membrane modules M in the second processing level E2 of the permeate mode) to the retentate mode (16 membrane modules M in the first processing level E1 and 50 membrane modules M in the second processing level E2 of the retentate mode) is performed by swapping the processing levels. This step is followed by a step of reassigning a membrane module M from the second processing level E2 to the first processing level E1. Thus, from a 44 mol %. content to a 60 mol %, 17 membrane modules M are assigned to the first processing level E1 and 49 membrane modules M are assigned to the second processing level E2.

Alternatively, the step of reassigning a membrane module M can be performed before the step of switching from the permeate mode to the retentate mode. Thus, a membrane module M of the first processing level E1 is first reassigned to the second processing level E2, then the two processing levels are inverted to carry out switching from the permeate mode to the retentate mode.

When the $CO_2$ content exceeds 60%, 7 membrane modules M of the second processing level E2 are reassigned to the first processing level E1 and 14 membrane modules M of the second processing level E2 are isolated.

Beyond 70% $CO_2$, 5 membrane modules M of the second processing level E2 are reassigned to the first processing level E1 and 8 membrane modules M of the second processing level E2 are isolated.

Alternatively, 5 isolated membrane modules M are assigned to the first processing level E1 and 13 membrane modules M of the second processing level E2 are isolated.

Figure 5:
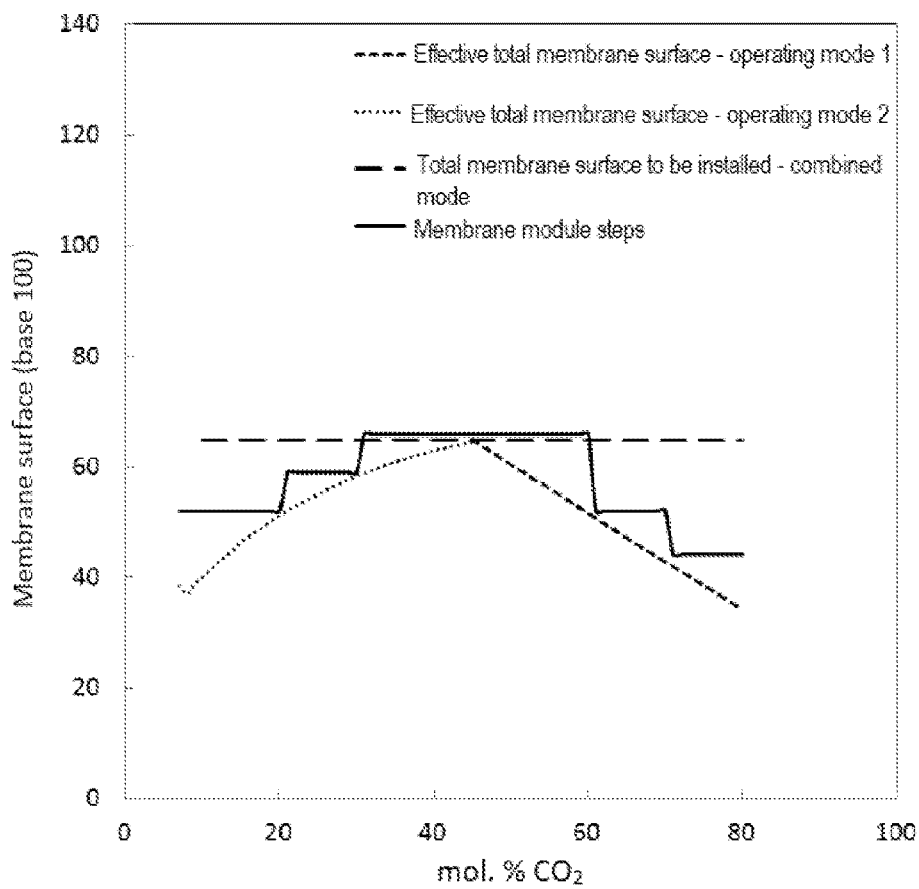
FIG. 5 is a graph showing the evolution in the membrane surface used by a method according to certain embodiments of the present invention comprising steps of reassigning the membrane modules and a step of switching from the permeate mode to the retentate mode.

As illustrated in FIG. 5, the combined use of the two operating modes as well as the transfer of membrane modules M from one processing level to the other allows limiting the total membrane surface installed to 66 (in base 100) and an optimal use of the total installed membrane surface.

Indeed, in the case where membrane modules M were not reassignable, in order to carry out the above processing, 50 membrane modules would have been necessary at the first processing level and 49 at the second processing level, for a total of 99 membrane modules needed. A 33%-gain is thus achieved.

In addition, the optimization of the installed membrane surface induces a higher gas separation quality than that required.

Figure 6:
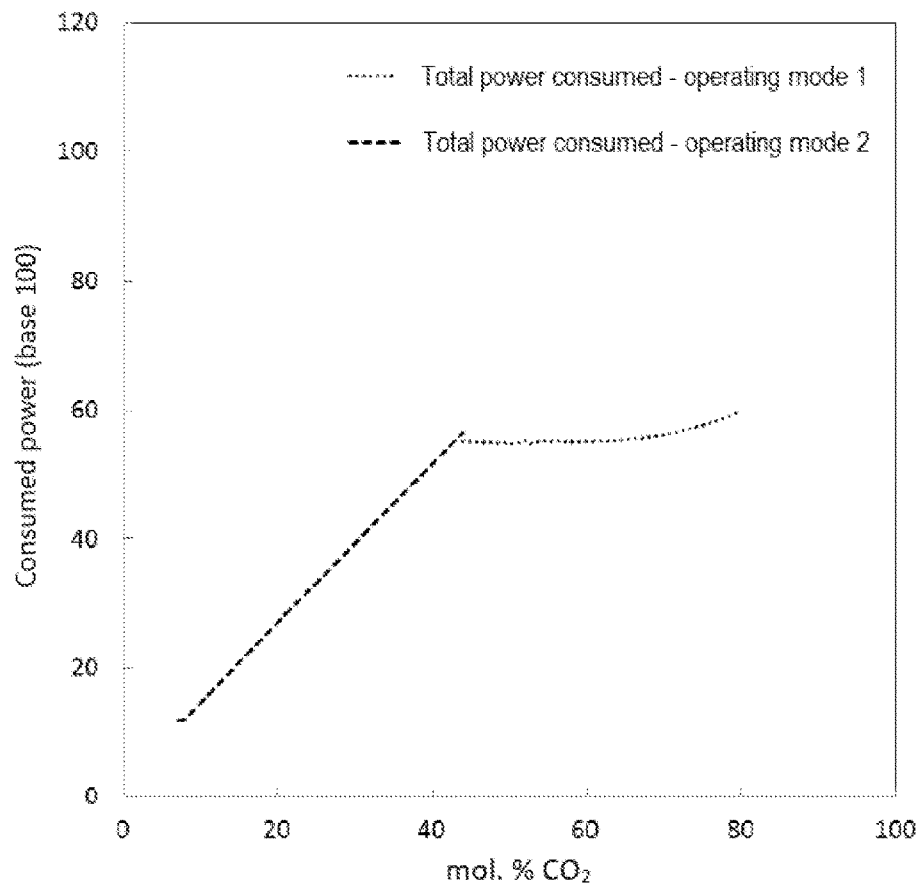
FIG. 6 is a graph showing the evolution in the total power required to operate the method according to certain embodiments of the present invention comprising steps of reassigning the membrane modules and a step of switching from the permeate mode to the retentate mode.

As illustrated in FIG. 6, the combined use of the two operating modes as well as the transfer of membrane modules M from one level to the other allows limiting the total consumed power, i.e. the total power required to carry out the method. Indeed, the total consumed power is less than that of both Examples 1 and 2.

Furthermore, it should be noted that the number of membrane modules for each of the two processing levels is changed in steps. Indeed, it is not realistic that the change in number of membrane modules is continuous given the fixed membrane surface made available by each membrane module. This incremental change is shown in Table 2 above and FIG. 5 (see curves showing "stairs").

It should be noted that this step-by-step change induces an excess in membrane surface, leading to a higher gas separation quality than required. Thus, in order to comply with the most common specifications on the gas collected at the end of processing (5 mol %. $CO_2$) and on the gas to be reinjected (95 mol %. $CO_2$), a bypass can be implemented. This can be a first processing level bypass in retentate mode in order to deplete the $CO_2$ contained in the gas to be reinjected and/or a second processing level bypass, still in retentate mode, in order to enrich the gas collected at the end of the processing with $CO_2$.

For example, for $CO_2$ contents in the gas to be processed lying between 70 mol %. and 80 mol %, 29 membrane modules are used in the first processing level and 15 membrane modules are used in the second processing level. For a $CO_2$ content lying at 70 mol %. in the gas to be processed, the specifications are met for the gas to be reinjected and the gas collected at the end of the processing. When this content reaches 80 mol %, the expected specifications are exceeded: the gas to be reinjected contains over 96 mol %. $CO_2$ instead of 95 mol %. and the gas collected at the end of the processing only contains 2.4 mol %. $CO_2$ instead of 5 mol %. By implementing a bypass of 3.7% of the gas arriving at the inlet of the first processing level and 23.1% of the gas arriving at the inlet of the second processing level, the specifications are again met without changing the surface membrane used.

Besides, the total membrane surface to be installed according to Example 3, and thus implemented, corresponds to 66 (in base 100) whereas the required surface results in unused surfaces appearing step by step once the required surfaces are less than the total membrane surface to be installed. The membrane modules corresponding to this difference are then isolated and disactivated and form an unexploited asset. It is therefore beneficial to make use of these unused surfaces. It is then possible to act upon the permeate pressure at the outlet(s) of one or both processing levels in order to meet the specifications of the acid gas and the processed gas while keeping a constant membrane surface (step) and limiting the consumed power.

The following Table 7 illustrates this option: for 70 mol %. of $CO_2$ in the gas to be processed, 52 membrane modules are required and the total consumed power is 56.1 (in base 100). When the $CO_2$ content reaches 80 mol %, the 52 membrane modules are kept in use and the permeate pressure (initially set at 1.8 bar, see penultimate column) of the two processing levels is increased (5.4 bar and 2.2 bar respectively for the first and second processing levels, see the last column). A bypass of 7% of the gas is required on the first processing level to meet the specification on the gas to be reinjected. In the end, the consumed power is reduced by 16%. It should be noted that this calculation is done by way of illustration on a single step but the principle remains the same for all steps, energy savings will be higher on average.

TABLE 7

| Example of using all of the implemented membrane surface and optimizing the permeate pressure | | | | |
|---|---|---|---|---|
| $CO_2$ content in the gas to be processed | mol %. | 70 | 80 | 80 |
| $CO_2$ in the acid gas | mol %. | 95 | 96.2 | 95 |
| $CO_2$ in the processed gas | mol %. | 5 | 2.4 | 5 |
| Total number of used membrane modules | — | 52 | 52 | 52 |
| Permeate pressure $1^{st}$ membrane level | bar | 1.8 | 1.8 | 5.4 |
| Permeate pressure $2^{nd}$ membrane level | bar | 1.8 | 1.8 | 2.2 |
| Power consumption for recycling | base 100 | 4.2 | 3.3 | 5.2 |
| Power consumption for acid gas reinjection | base 100 | 51.9 | 59.3 | 42.0 |
| Total power consumption | base 100 | 56.1 | 62.6 | 47.2 |
| By-pass gas $1^{st}$ level membrane | % | 0 | 0 | 7 |
| By-pass gas $2^{nd}$ level membrane | % | 0 | 0 | 0 |

The invention claimed is:

1. A method for processing a natural gas containing carbon dioxide in an installation comprising:
   a plurality of membrane modules, a first portion of the plurality of the membrane modules being assigned to a first processing level defining a first membrane surface, and a second portion of the plurality of membrane modules being assigned to a second processing level defining a second membrane surface;
   wherein in a retentate mode, the first processing level and the second processing level being fluidly connected in retentate series;
   wherein in a permeate mode, the first processing level and the second processing level being fluidly connected in permeate series; and
   wherein the natural gas processing is carried out according to the retentate mode, then when the content in carbon dioxide present in the natural gas reaches a given value, the processing of the natural gas is carried out according to the permeate mode, or
   wherein the natural gas processing is carried out according to the permeate mode, then when the content in carbon dioxide present in the natural gas reaches a given value, the processing of natural gas is carried out according to the retentate mode.

2. The processing method according to claim 1, wherein the installation further comprises:
   a natural gas supply line;
   a transfer inlet line;
   a permeate collection line;
   a retentate collection line;
   a permeate transfer line; and
   a retentate transfer line;
   wherein each of the plurality of membrane modules comprising an inlet, a permeate outlet and a retentate outlet;

wherein the first processing level and the second processing level being in permeate series so that:

in the first processing level, all of the module inlets are fluidly connected to the supply line, all of the retentate outlets are fluidly connected to the retentate collection line, all of the permeate outlets are fluidly connected to the permeate transfer line, and all of the permeate outlets fluidly connected to the permeate transfer line being fluidly connected to the transfer inlet line;

in the second processing level, all of the module inlets are fluidly connected to the transfer inlet line, all of the permeate outlets are fluidly connected to the permeate collection line, all of the retentate outlets are fluidly connected to the retentate transfer line, and all of the retentate outlets fluidly connected to the retentate transfer line being fluidly connected to the supply line;

wherein, switching from the permeate mode to the retentate mode is carried out as follows:

fluidly disconnecting the inlet, the permeate outlet and the retentate outlet of the membrane modules;

and fluidly connecting the inlet, the permeate outlet and the retentate outlet of at least part of the membrane modules so that:

in the first processing level, all of the module inlets are fluidly connected to the supply line, all of the permeate outlets are fluidly connected to the permeate collection line, all of the retentate outlets are fluidly connected to the retentate transfer line, and all of the retentate outlets fluidly connected to the retentate transfer lines being fluidly connected to the transfer inlet line;

in the second processing level, all of the module inlets are fluidly connected to the transfer inlet line, all of the retentate outlets are fluidly connected to the retentate collection line, all of the permeate outlets are fluidly connected to the permeate transfer line, and all of the permeate outlets fluidly connected to the permeate transfer line being fluidly connected to the supply line.

3. The processing method according to claim 2, further comprising compressing the permeate collected in the permeate transfer line.

4. The processing method according to claim 3, further comprising compressing the permeate collected in the permeate collection line.

5. The processing method according to claim 2, wherein the carbon dioxide content in the natural gas requires a required total membrane surface, the membrane modules providing a total available surface, wherein when the total available membrane surface exceeds the total surface required for $CO_2$ separation, the permeate pressure being increased on any of the processing levels of the installation.

6. The processing method according to claim 4, wherein the increase in permeate pressure is achieved by:

decreasing the rotational speed of a compressor; or orienting the blades of a compressor.

7. Installation for processing a natural gas containing carbon dioxide, comprising:

a natural gas supply line;
a transfer inlet line;
a permeate collection line;
retentate collection line;
a permeate transfer line;
a retentate transfer line; and
a plurality of membrane modules, each of the plurality of membrane modules comprising an inlet fluidly connectable to the supply line and to the transfer inlet line, a retentate outlet fluidly connectable to the retentate collection line and to the retentate transfer line, and a permeate outlet fluidly connectable to the permeate collection line and to the permeate transfer line, each of the plurality of membrane modules being fluidly isolatable from the lines; and
a valve system adapted to assign a first portion of the plurality of membrane modules to a first processing level and a second portion of the plurality of membrane modules to a second processing level so as to:

according to a retentate mode in retentate series:

in the first processing level, all of the module inlets are fluidly connected to the supply line, all of the permeate outlets are fluidly connected to the permeate collection line, all of the retentate outlets are fluidly connected to the retentate transfer line, and all of the retentate outlets fluidly connected to the retentate transfer line being fluidly connected to the transfer inlet line;

in the second processing level, all of the module inlets are fluidly connected to the transfer inlet line, all of the retentate outlets are fluidly connected to the retentate collection line, all of the permeate outlets are fluidly connected to the permeate transfer line, and all of the permeate outlets fluidly connected to the permeate transfer line being fluidly connected to the supply line;

according to a permeate mode in permeate series:

in the first processing level, all of the module inlets are fluidly connected to the supply line, all of the retentate outlets are fluidly connected to the retentate collection line, all of the permeate outlets are fluidly connected to the permeate transfer line, and all of the permeate outlets fluidly connected to the permeate transfer line being fluidly connected to the transfer inlet line;

in the second processing level, all of the module inlets are fluidly connected to the transfer inlet line, all of the permeate outlets are fluidly connected to the permeate collection line, all of the retentate outlets are fluidly connected to the retentate transfer line, and all of the retentate outlets fluidly connected to the retentate transfer line being fluidly connected to the supply line.

8. The processing method according to claim 2, further comprising compressing the permeate collected in the permeate collection line.

* * * * *